(12) United States Patent
Lundblad et al.

(10) Patent No.: US 10,493,731 B2
(45) Date of Patent: *Dec. 3, 2019

(54) METHOD TO PRODUCE A THERMOPLASTIC WEAR RESISTANT FOIL

(71) Applicant: VALINGE INNOVATION AB, Viken (SE)

(72) Inventors: Christer Lundblad, Orkelljunga (SE); Niclas Hakansson, Viken (SE); Goran Ziegler, Viken (SE)

(73) Assignee: VALINGE INNOVATION AB, Viken (SE)

( * ) Notice: Subject to any disclaimer, the term of this patent is extended or adjusted under 35 U.S.C. 154(b) by 86 days.

This patent is subject to a terminal disclaimer.

(21) Appl. No.: 14/790,850

(22) Filed: Jul. 2, 2015

(65) Prior Publication Data
US 2016/0016391 A1   Jan. 21, 2016

(30) Foreign Application Priority Data

Jul. 16, 2014 (SE) .................................. 1450894
Jul. 16, 2014 (SE) .................................. 1450895
Apr. 16, 2015 (SE) .................................. 1550455

(51) Int. Cl.
*B32B 37/24* (2006.01)
*B32B 27/14* (2006.01)
(Continued)

(52) U.S. Cl.
CPC ............... *B32B 27/08* (2013.01); *B32B 5/16* (2013.01); *B32B 5/18* (2013.01); *B32B 27/065* (2013.01);
(Continued)

(58) Field of Classification Search
CPC .......... B32B 2307/554; B32B 2317/16; B32B 2471/00; B32B 38/06; B32B 38/145; B32B 2037/243; B32B 2264/067; B32B 2264/101; B32B 2264/102; B32B 2270/00; B32B 2305/30; B32B 2307/412;
(Continued)

(56) References Cited

U.S. PATENT DOCUMENTS 213,740 A   4/1879  Connor
1,018,987 A  2/1912  Philpot et al.
(Continued)

FOREIGN PATENT DOCUMENTS

CA   1 237 344      5/1988
CA   2 252 791 A1   5/1999
(Continued)

OTHER PUBLICATIONS

U.S. Appl. No. 14/994,593, Håkansson et al.
(Continued)

*Primary Examiner* — Alexander M Weddle
(74) *Attorney, Agent, or Firm* — Buchanan Ingersoll & Rooney P.C.

(57) ABSTRACT

A method to produce a wear resistant foil, including providing a first foil including a first thermoplastic material, applying wear resistant particles and a second thermoplastic material form on the first foil, and adhering the first foil to the second thermoplastic binder and the wear resistant particles to form a wear resistant foil.

36 Claims, 3 Drawing Sheets

(51) Int. Cl.
*B32B 37/14* (2006.01)
*B05D 3/12* (2006.01)
*B05D 7/06* (2006.01)
*B32B 27/08* (2006.01)
*B32B 27/30* (2006.01)
*B32B 27/40* (2006.01)
*B32B 27/20* (2006.01)
*B32B 27/32* (2006.01)
*B32B 27/36* (2006.01)
*B32B 5/16* (2006.01)
*B32B 37/10* (2006.01)
*B32B 33/00* (2006.01)
*B32B 5/18* (2006.01)
*B32B 27/06* (2006.01)
*B32B 27/22* (2006.01)
*B29C 48/15* (2019.01)
*B32B 37/12* (2006.01)
*B32B 37/15* (2006.01)
*B32B 37/22* (2006.01)
*B32B 38/06* (2006.01)
*B32B 38/00* (2006.01)
*B29K 627/06* (2006.01)
*B29K 75/00* (2006.01)

(52) U.S. Cl.
CPC ............ *B32B 27/14* (2013.01); *B32B 27/20* (2013.01); *B32B 27/22* (2013.01); *B32B 27/304* (2013.01); *B32B 27/32* (2013.01); *B32B 27/36* (2013.01); *B32B 27/365* (2013.01); *B32B 27/40* (2013.01); *B32B 33/00* (2013.01); *B32B 37/10* (2013.01); *B32B 37/14* (2013.01); *B32B 37/24* (2013.01); *B29C 48/15* (2019.02); *B29K 2075/00* (2013.01); *B29K 2627/06* (2013.01); *B32B 37/1027* (2013.01); *B32B 37/12* (2013.01); *B32B 37/153* (2013.01); *B32B 37/223* (2013.01); *B32B 38/06* (2013.01); *B32B 38/145* (2013.01); *B32B 2250/02* (2013.01); *B32B 2250/24* (2013.01); *B32B 2250/246* (2013.01); *B32B 2250/40* (2013.01); *B32B 2264/02* (2013.01); *B32B 2264/067* (2013.01); *B32B 2264/10* (2013.01); *B32B 2264/101* (2013.01); *B32B 2264/102* (2013.01); *B32B 2264/107* (2013.01); *B32B 2264/12* (2013.01); *B32B 2270/00* (2013.01); *B32B 2307/412* (2013.01); *B32B 2307/554* (2013.01); *B32B 2307/584* (2013.01); *B32B 2307/744* (2013.01); *B32B 2309/105* (2013.01); *B32B 2317/16* (2013.01); *B32B 2419/00* (2013.01); *B32B 2419/04* (2013.01); *B32B 2471/00* (2013.01)

(58) Field of Classification Search
CPC ........ B32B 2307/584; B32B 2307/744; B32B 2309/02; B32B 2309/105; B32B 2309/12; B32B 2317/02; B32B 2317/125; B32B 2419/00; B32B 2419/04; B32B 27/065; B32B 27/08; B32B 27/20; B32B 27/22; B32B 27/304; B32B 27/32; B32B 27/36; B32B 33/00; B32B 37/10; B32B 37/1027; B32B 37/12; B32B 37/14; B32B 37/153; B32B 37/223; B32B 37/24; B32B 38/0036; B32B 5/18; B32B 2401/32; B05D 3/12; B05D 5/02; B05D 5/06; B05D 7/06; B29C 47/02; B29K 2075/00; B29K 2627/06; B44C 5/0476; B44C 5/0492; C23C 16/44; E04B 5/00; E04F 15/02038; E04F 15/10; E04F 15/105; E04F 2201/0138; E04F 2201/0146; E04F 2201/0153

See application file for complete search history.

(56) References Cited

U.S. PATENT DOCUMENTS

| | | |
|---|---|---|
| 1,361,501 A | 12/1920 | Schepmoes |
| 1,394,120 A | 10/1921 | Rockwell |
| 1,723,306 A | 8/1929 | Sipe |
| 1,743,492 A | 1/1930 | Sipe |
| 1,787,027 A | 12/1930 | Wasleff |
| 1,925,070 A | 8/1933 | Livezey |
| 1,946,646 A | 2/1934 | Storm |
| 1,946,690 A | 2/1934 | Haines |
| 2,015,813 A | 10/1935 | Nielsen |
| 2,088,238 A | 7/1937 | Greenway |
| 2,089,075 A | 8/1937 | Siebs |
| 2,142,305 A | 1/1939 | Davis |
| 2,204,675 A | 6/1940 | Grunert |
| 2,266,464 A | 12/1941 | Kraft |
| 2,303,745 A | 12/1942 | Karreman |
| 2,306,295 A | 12/1942 | Casto |
| 2,355,834 A | 8/1944 | Webb |
| 2,497,837 A | 2/1950 | Nelson |
| 2,740,167 A | 4/1956 | Rowley |
| 2,769,726 A | 11/1956 | Wetterau et al. |
| 2,818,895 A | 1/1958 | Zuber |
| 2,861,372 A | 11/1958 | Hunt |
| 2,872,712 A | 2/1959 | Brown |
| 2,947,040 A | 8/1960 | Schultz |
| 3,055,461 A | 9/1962 | De Ridder |
| 3,087,269 A | 4/1963 | Hudson |
| 3,120,083 A | 2/1964 | Dahlberg et al. |
| 3,135,643 A | 6/1964 | Michl |
| 3,247,638 A | 4/1966 | Gay et al. |
| 3,259,417 A | 7/1966 | Chapman |
| 3,286,006 A | 11/1966 | Annand |
| 3,308,013 A | 3/1967 | Bryant |
| 3,310,919 A | 3/1967 | Bue et al. |
| 3,397,496 A | 8/1968 | Sohns |
| 3,436,888 A | 4/1969 | Ottosson |
| 3,538,665 A | 11/1970 | Gohner |
| 3,554,850 A | 1/1971 | Kuhle |
| 3,578,548 A | 5/1971 | Wesp |
| 3,619,963 A | 11/1971 | Omholt |
| 3,623,288 A | 11/1971 | Horowitz |
| 3,657,852 A | 4/1972 | Worthington et al. |
| 3,694,983 A | 10/1972 | Couquet |
| 3,760,547 A | 9/1973 | Brenneman |
| 3,857,749 A | 12/1974 | Yoshida |
| 3,883,258 A | 5/1975 | Hewson |
| 3,887,678 A | 6/1975 | Lewicki, Jr. |
| 3,908,725 A | 9/1975 | Koch |
| 3,937,861 A | 2/1976 | Zuckerman et al. |
| 3,946,529 A | 3/1976 | Chevaux |
| 3,950,915 A | 4/1976 | Cole |
| 4,023,596 A | 5/1977 | Tate |
| 4,037,377 A | 7/1977 | Howell et al. |
| 4,092,198 A | 5/1978 | Scher |
| 4,093,766 A | 6/1978 | Scher |
| 4,100,710 A | 7/1978 | Kowallik |
| 4,169,688 A | 10/1979 | Toshio |
| 4,170,859 A | 10/1979 | Counihan |
| 4,176,210 A | 11/1979 | Skinner |
| 4,226,064 A | 10/1980 | Kraayenhof |
| 4,242,390 A | 12/1980 | Nemeth |
| 4,255,480 A | 3/1981 | Scher |
| 4,256,793 A | 3/1981 | Cannady, Jr. et al. |
| 4,296,017 A | 10/1981 | Weissgerber et al. |
| 4,299,070 A | 11/1981 | Oltmanns et al. |
| 4,312,686 A | 1/1982 | Smith et al. |
| 4,315,724 A | 2/1982 | Taoka et al. |
| 4,376,147 A | 3/1983 | Byrne et al. |
| 4,396,566 A | 8/1983 | Brinkmann et al. |
| 4,426,820 A | 1/1984 | Terbrack et al. |

(56) References Cited

U.S. PATENT DOCUMENTS

| | | |
|---|---|---|
| 4,430,375 A | 2/1984 | Scher |
| 4,450,194 A | 5/1984 | Kauffman et al. |
| 4,454,699 A | 6/1984 | Strobl |
| 4,489,115 A | 12/1984 | Layman et al. |
| 4,512,131 A | 4/1985 | Laramore |
| 4,526,418 A | 7/1985 | Martin |
| 4,570,353 A | 2/1986 | Evans |
| 4,574,099 A | 3/1986 | Nixon |
| 4,599,841 A | 7/1986 | Haid |
| 4,610,900 A | 9/1986 | Nishibori |
| 4,615,090 A | 10/1986 | Baus |
| 4,724,187 A | 2/1988 | Ungar et al. |
| 4,756,856 A | 7/1988 | Choinski |
| 4,759,164 A | 7/1988 | Abendroth et al. |
| 4,769,963 A | 9/1988 | Meyerson |
| 4,788,088 A | 11/1988 | Kohl |
| 4,807,412 A | 2/1989 | Frederiksen |
| 4,849,768 A | 7/1989 | Graham |
| 4,916,007 A | 4/1990 | Manning et al. |
| 4,944,514 A | 7/1990 | Suiter |
| 4,947,595 A | 8/1990 | Douds et al. |
| 4,976,221 A | 12/1990 | Yetter |
| 5,007,222 A | 4/1991 | Raymond |
| 5,050,362 A | 9/1991 | Tal et al. |
| 5,052,158 A | 10/1991 | D'Luzansky |
| 5,076,034 A | 12/1991 | Bandy |
| 5,112,671 A | 5/1992 | Diamond et al. |
| 5,134,026 A | 7/1992 | Melcher |
| 5,162,141 A | 11/1992 | Davey et al. |
| 5,185,193 A | 2/1993 | Phenicie et al. |
| 5,188,876 A | 2/1993 | Hensel et al. |
| 5,229,217 A | 7/1993 | Holzer |
| 5,266,384 A | 11/1993 | O'Dell |
| 5,295,341 A | 3/1994 | Kajiwara |
| 5,322,335 A | 6/1994 | Niemi |
| 5,333,429 A | 8/1994 | Cretti |
| 5,349,796 A | 9/1994 | Meyerson |
| 5,367,844 A | 11/1994 | Diedrich |
| 5,433,806 A | 7/1995 | Pasquali et al. |
| 5,466,511 A | 11/1995 | O'Dell et al. |
| 5,480,602 A | 1/1996 | Nagaich |
| 5,502,939 A | 4/1996 | Zadok |
| 5,503,788 A | 4/1996 | Lazareck et al. |
| 5,516,472 A | 5/1996 | Laver |
| 5,543,193 A | 8/1996 | Tesch |
| 5,547,741 A | 8/1996 | Wilson |
| 5,553,427 A | 9/1996 | Andres |
| 5,604,025 A | 2/1997 | Tesch |
| 5,613,339 A | 3/1997 | Pollock |
| 5,618,602 A | 4/1997 | Nelson |
| 5,642,592 A | 7/1997 | Andres |
| 5,647,184 A | 7/1997 | Davis |
| 5,653,099 A | 8/1997 | MacKenzie |
| 5,660,016 A | 8/1997 | Erwin et al. |
| 5,662,977 A | 9/1997 | Spain et al. |
| 5,670,237 A | 9/1997 | Shultz et al. |
| 5,671,575 A | 9/1997 | Wu |
| 5,694,730 A | 12/1997 | Del Rincon et al. |
| 5,706,621 A | 1/1998 | Pervan |
| 5,713,165 A | 2/1998 | Erwin |
| 5,724,909 A | 3/1998 | Pitman et al. |
| 5,728,476 A | 3/1998 | Harwood |
| 5,755,068 A | 5/1998 | Ormiston |
| 5,758,466 A | 6/1998 | Tucker |
| 5,766,522 A | 6/1998 | Daly et al. |
| 5,777,014 A | 7/1998 | Hopper et al. |
| 5,780,147 A | 7/1998 | Sugahara et al. |
| 5,787,655 A | 8/1998 | Saylor, Jr. |
| 5,791,113 A | 8/1998 | Glowa et al. |
| 5,797,237 A | 8/1998 | Finkell, Jr. |
| 5,833,386 A | 11/1998 | Rosan et al. |
| 5,836,128 A | 11/1998 | Groh et al. |
| 5,855,832 A | 1/1999 | Clausi |
| 5,856,389 A | 1/1999 | Kostrzewski et al. |
| 5,858,160 A | 1/1999 | Piacente |
| 5,863,632 A | 1/1999 | Bisker |
| 5,869,138 A | 2/1999 | Nishibori |
| D406,360 S | 3/1999 | Finkell, Jr. |
| 5,900,099 A | 5/1999 | Sweet |
| 5,989,668 A | 11/1999 | Nelson et al. |
| 6,004,417 A | 12/1999 | Roesch et al. |
| 6,006,486 A | 12/1999 | Moriau |
| 6,013,222 A | 1/2000 | Douglas et al. |
| 6,023,907 A | 2/2000 | Pervan |
| 6,027,599 A | 2/2000 | Wang |
| 6,029,416 A | 2/2000 | Anderson |
| 6,093,473 A | 7/2000 | Min |
| 6,101,778 A | 8/2000 | Martensson |
| 6,103,377 A | 8/2000 | Clausi |
| 6,139,945 A | 10/2000 | Krejchi et al. |
| 6,173,548 B1 | 1/2001 | Hamar et al. |
| 6,189,282 B1 | 2/2001 | Vanderwerf |
| 6,218,001 B1 | 4/2001 | Chen |
| 6,233,899 B1 | 5/2001 | Mellert et al. |
| 6,260,326 B1 | 7/2001 | Muller-Hartburg |
| 6,314,701 B1 | 11/2001 | Meyerson |
| 6,324,809 B1 | 12/2001 | Nelson |
| 6,332,733 B1 | 12/2001 | Hamberger et al. |
| 6,345,481 B1 | 2/2002 | Nelson |
| 6,363,677 B1 | 4/2002 | Chen |
| 6,397,547 B1 | 6/2002 | Martensson |
| 6,423,167 B1 | 7/2002 | Palmer et al. |
| 6,428,871 B1 | 8/2002 | Cozzolino |
| 6,438,919 B1 | 8/2002 | Knauseder |
| 6,444,075 B1 | 9/2002 | Schneider et al. |
| 6,455,127 B1 | 9/2002 | Valtanen |
| 6,460,306 B1 | 10/2002 | Nelson |
| 6,468,645 B1 | 10/2002 | Clausi |
| 6,505,452 B1 | 1/2003 | Hannig |
| 6,536,178 B1 | 3/2003 | Palsson et al. |
| 6,546,691 B2 | 4/2003 | Leopolder |
| 6,558,070 B1 | 5/2003 | Valtanen |
| 6,579,610 B1 * | 6/2003 | Shortland ............ D06N 7/0055 427/180 |
| 6,591,568 B1 | 7/2003 | Palsson et al. |
| 6,617,009 B1 | 9/2003 | Chen et al. |
| 6,647,690 B1 | 11/2003 | Martensson |
| 6,666,951 B1 | 12/2003 | Kostiw |
| 6,671,968 B1 | 1/2004 | Shannon |
| 6,672,030 B2 | 1/2004 | Schulte |
| 6,675,545 B2 | 1/2004 | Chen et al. |
| 6,695,944 B2 | 2/2004 | Courtney |
| 6,711,869 B2 | 3/2004 | Tychsen |
| 6,715,253 B2 | 4/2004 | Pervan |
| 6,729,091 B1 | 5/2004 | Martensson |
| 6,761,008 B2 | 7/2004 | Chen et al. |
| 6,766,622 B1 | 7/2004 | Thiers |
| 6,769,218 B2 | 8/2004 | Pervan |
| 6,769,219 B2 | 8/2004 | Schwitte et al. |
| 6,786,019 B2 | 9/2004 | Thiers |
| 6,803,110 B2 | 10/2004 | Drees et al. |
| 6,804,926 B1 | 10/2004 | Eisermann |
| 6,835,421 B1 | 12/2004 | Dohring |
| 6,851,237 B2 | 2/2005 | Niese et al. |
| 6,854,235 B2 | 2/2005 | Martensson |
| 6,862,857 B2 | 3/2005 | Tychsen |
| 6,874,292 B2 | 4/2005 | Moriau |
| 6,880,305 B2 | 4/2005 | Pervan et al. |
| 6,880,307 B2 | 4/2005 | Schwitte |
| 6,895,881 B1 | 5/2005 | Whitaker |
| 6,898,911 B2 | 5/2005 | Kornfalt et al. |
| 6,898,913 B2 | 5/2005 | Pervan |
| 6,918,220 B2 | 7/2005 | Pervan |
| 6,922,964 B2 | 8/2005 | Pervan |
| 6,922,965 B2 | 8/2005 | Rosenthal et al. |
| 6,926,954 B2 | 8/2005 | Schuren et al. |
| 6,933,043 B2 | 8/2005 | Son et al. |
| 6,955,020 B2 | 10/2005 | Moriau et al. |
| 6,966,963 B2 | 11/2005 | O'Connor |
| 6,986,934 B2 | 1/2006 | Chen et al. |
| 7,051,486 B2 | 5/2006 | Pervan |
| 7,086,205 B2 | 8/2006 | Pervan |
| 7,090,430 B1 | 8/2006 | Fletcher |
| D528,671 S | 9/2006 | Grafenauer |

(56) References Cited

U.S. PATENT DOCUMENTS

| | | |
|---|---|---|
| 7,121,058 B2 | 10/2006 | Palsson et al. |
| 7,127,860 B2 | 10/2006 | Pervan et al. |
| 7,137,229 B2 | 11/2006 | Pervan |
| 7,155,871 B1 | 1/2007 | Stone |
| 7,169,460 B1 | 1/2007 | Chen et al. |
| 7,171,791 B2 | 2/2007 | Pervan |
| 7,211,310 B2 | 5/2007 | Chen et al. |
| 7,261,947 B2 | 8/2007 | Reichwein |
| 7,275,350 B2 | 10/2007 | Pervan et al. |
| 7,276,265 B2 | 10/2007 | Sigel et al. |
| 7,328,536 B2 | 2/2008 | Moriau et al. |
| 7,337,588 B1 | 3/2008 | Moebus |
| 7,356,971 B2 | 4/2008 | Pervan |
| 7,386,963 B2 | 6/2008 | Pervan |
| 7,398,625 B2 | 7/2008 | Pervan |
| 7,419,717 B2 | 9/2008 | Chen et al. |
| 7,454,875 B2 | 11/2008 | Pervan et al. |
| 7,516,588 B2 | 4/2009 | Pervan |
| 7,543,418 B2 | 6/2009 | Weitzer |
| 7,544,423 B2 | 6/2009 | Horton |
| 7,568,322 B2 | 8/2009 | Pervan et al. |
| 7,576,140 B2 | 8/2009 | Tamaki et al. |
| 7,584,583 B2 | 9/2009 | Bergelin et al. |
| 7,603,826 B1 | 10/2009 | Moebus |
| 7,739,849 B2 | 6/2010 | Pervan |
| 7,763,345 B2 | 7/2010 | Chen et al. |
| 7,770,350 B2 | 8/2010 | Moriau et al. |
| 7,779,597 B2 | 8/2010 | Thiers et al. |
| 7,802,415 B2 | 9/2010 | Pervan |
| 7,816,000 B2 | 10/2010 | Sparks et al. |
| 7,856,784 B2 | 12/2010 | Martensson |
| 7,856,789 B2 | 12/2010 | Eisermann |
| 7,866,115 B2 | 1/2011 | Pervan et al. |
| 7,877,956 B2 | 2/2011 | Martensson |
| 7,886,497 B2 | 2/2011 | Pervan et al. |
| 7,896,571 B1 | 3/2011 | Hannig et al. |
| 7,926,234 B2 | 4/2011 | Pervan |
| 7,930,862 B2 | 4/2011 | Bergelin et al. |
| 7,958,689 B2 | 6/2011 | Lei |
| 7,980,043 B2 | 7/2011 | Moebus |
| 7,984,600 B2 | 7/2011 | Alford et al. |
| 8,021,741 B2 | 9/2011 | Chen et al. |
| 8,028,486 B2 | 10/2011 | Pervan |
| 8,043,661 B2 | 10/2011 | Linnemann |
| 8,071,193 B2 | 12/2011 | Windmoller |
| 8,099,919 B2 | 1/2012 | Garcia |
| 8,112,891 B2 | 2/2012 | Pervan |
| 8,166,718 B2 | 5/2012 | Liu |
| 8,171,691 B1 | 5/2012 | Stone |
| 8,182,928 B2 | 5/2012 | Horton |
| 8,234,829 B2 | 8/2012 | Thiers et al. |
| 8,245,478 B2 | 8/2012 | Bergelin et al. |
| 8,293,058 B2 | 10/2012 | Pervan et al. |
| 8,356,452 B2 | 1/2013 | Thiers et al. |
| 8,365,499 B2 | 2/2013 | Nilsson et al. |
| 8,375,674 B2 | 2/2013 | Braun |
| 8,431,054 B2 | 4/2013 | Pervan |
| 8,480,841 B2 | 7/2013 | Pervan et al. |
| 8,484,924 B2 | 7/2013 | Braun |
| 8,490,361 B2 | 7/2013 | Curry et al. |
| 8,511,031 B2 | 8/2013 | Bergelin et al. |
| 8,544,231 B2 | 10/2013 | Hannig |
| 8,584,423 B2 | 11/2013 | Pervan et al. |
| 8,613,826 B2 | 12/2013 | Pervan et al. |
| 8,658,274 B2 | 2/2014 | Chen et al. |
| 8,683,698 B2 | 4/2014 | Pervan et al. |
| 8,756,899 B2 | 6/2014 | Nilsson et al. |
| 8,800,150 B2 | 8/2014 | Pervan |
| 8,833,028 B2 | 9/2014 | Whispell et al. |
| 8,834,992 B2 | 9/2014 | Chen et al. |
| 8,875,465 B2 | 11/2014 | Martensson |
| 8,973,270 B2 | 3/2015 | Siebert et al. |
| 9,156,233 B2 | 10/2015 | Dossche et al. |
| 9,194,133 B2 | 11/2015 | Thiers |
| 9,200,460 B2 | 12/2015 | Cappelle |
| 9,222,267 B2 | 12/2015 | Bergelin et al. |
| 9,249,581 B2 | 2/2016 | Nilsson et al. |
| 9,296,191 B2 | 3/2016 | Pervan et al. |
| 9,314,936 B2 | 4/2016 | Pervan |
| 9,410,328 B2 | 8/2016 | Pervan |
| 9,670,371 B2 | 6/2017 | Pervan et al. |
| 9,695,601 B2 | 7/2017 | Whispell et al. |
| 9,714,515 B2 | 7/2017 | Pervan |
| 9,765,530 B2 | 9/2017 | Bergelin et al. |
| 10,047,527 B2 | 8/2018 | Nilsson et al. |
| 10,059,084 B2 * | 8/2018 | Lundblad ............... B32B 27/08 |
| 10,137,659 B2 | 11/2018 | Pervan |
| 10,287,777 B2 | 5/2019 | Boo et al. |
| 10,301,830 B2 | 5/2019 | Boo |
| 10,316,526 B2 | 6/2019 | Kell |
| 2001/0021431 A1 | 9/2001 | Chen |
| 2001/0036557 A1 | 11/2001 | Ingrim et al. |
| 2002/0007608 A1 | 1/2002 | Pervan |
| 2002/0007609 A1 | 1/2002 | Pervan |
| 2002/0023702 A1 | 2/2002 | Kettler |
| 2002/0025446 A1 | 2/2002 | Chen et al. |
| 2002/0031646 A1 | 3/2002 | Chen |
| 2002/0046433 A1 | 4/2002 | Sellman et al. |
| 2002/0046527 A1 | 4/2002 | Nelson |
| 2002/0056245 A1 | 5/2002 | Thiers |
| 2002/0083673 A1 | 7/2002 | Kettler et al. |
| 2002/0092263 A1 | 7/2002 | Schulte |
| 2002/0095894 A1 | 7/2002 | Pervan |
| 2002/0100231 A1 | 8/2002 | Miller et al. |
| 2002/0112429 A1 | 8/2002 | Niese et al. |
| 2002/0112433 A1 | 8/2002 | Pervan |
| 2002/0142135 A1 | 10/2002 | Chen et al. |
| 2002/0146568 A1 | 10/2002 | Ho et al. |
| 2002/0170257 A1 | 11/2002 | McLain et al. |
| 2002/0170258 A1 | 11/2002 | Schwitte et al. |
| 2002/0178674 A1 | 12/2002 | Pervan |
| 2002/0178681 A1 | 12/2002 | Zancai |
| 2002/0189183 A1 | 12/2002 | Ricciardelli |
| 2003/0009971 A1 | 1/2003 | Palmberg |
| 2003/0024199 A1 | 2/2003 | Pervan |
| 2003/0024200 A1 | 2/2003 | Moriau et al. |
| 2003/0033777 A1 | 2/2003 | Thiers et al. |
| 2003/0055145 A1 | 3/2003 | Safta et al. |
| 2003/0059639 A1 | 3/2003 | Worsley |
| 2003/0072919 A1 | 4/2003 | Watts, Jr. et al. |
| 2003/0101674 A1 | 6/2003 | Pervan et al. |
| 2003/0101681 A1 | 6/2003 | Tychsen |
| 2003/0154676 A1 | 8/2003 | Schwartz |
| 2003/0196397 A1 | 10/2003 | Niese et al. |
| 2003/0196405 A1 | 10/2003 | Pervan |
| 2004/0003888 A1 | 1/2004 | Mott et al. |
| 2004/0016196 A1 | 1/2004 | Pervan |
| 2004/0031226 A1 | 2/2004 | Knauseder |
| 2004/0035078 A1 | 2/2004 | Pervan |
| 2004/0048044 A1 * | 3/2004 | Schneider ............... B32B 3/00 428/161 |
| 2004/0068954 A1 | 4/2004 | Martensson |
| 2004/0107659 A1 | 6/2004 | Glockl |
| 2004/0139678 A1 | 7/2004 | Pervan |
| 2004/0177584 A1 | 9/2004 | Pervan |
| 2004/0182036 A1 | 9/2004 | Sjöberg et al. |
| 2004/0200154 A1 | 10/2004 | Hunter |
| 2004/0206036 A1 | 10/2004 | Pervan |
| 2004/0211144 A1 | 10/2004 | Stanchfield |
| 2004/0241416 A1 | 12/2004 | Tian et al. |
| 2004/0248489 A1 | 12/2004 | Hutchison et al. |
| 2004/0255538 A1 | 12/2004 | Ruhdorfer |
| 2004/0255541 A1 | 12/2004 | Thiers et al. |
| 2005/0003160 A1 | 1/2005 | Chen et al. |
| 2005/0055943 A1 | 3/2005 | Pervan |
| 2005/0107006 A1 | 5/2005 | Makino |
| 2005/0136234 A1 | 6/2005 | Hak |
| 2005/0138881 A1 | 6/2005 | Pervan |
| 2005/0166502 A1 | 8/2005 | Pervan |
| 2005/0166516 A1 | 8/2005 | Pervan |
| 2005/0193677 A1 | 9/2005 | Vogel |
| 2005/0208255 A1 | 9/2005 | Pervan |
| 2005/0210810 A1 | 9/2005 | Pervan |
| 2005/0268570 A2 | 12/2005 | Pervan |

(56) References Cited

U.S. PATENT DOCUMENTS

| | | |
|---|---|---|
| 2006/0032168 A1 | 2/2006 | Thiers |
| 2006/0048474 A1 | 3/2006 | Pervan et al. |
| 2006/0075713 A1 | 4/2006 | Pervan et al. |
| 2006/0099386 A1 | 5/2006 | Smith |
| 2006/0101769 A1 | 5/2006 | Pervan et al. |
| 2006/0130421 A1 | 6/2006 | Nollet et al. |
| 2006/0144004 A1 | 7/2006 | Nollet et al. |
| 2006/0156666 A1 | 7/2006 | Caufield |
| 2006/0191861 A1 | 8/2006 | Mitterhofer et al. |
| 2006/0196139 A1 | 9/2006 | Pervan |
| 2006/0283127 A1 | 12/2006 | Pervan |
| 2007/0011981 A1 | 1/2007 | Eiserman |
| 2007/0028547 A1 | 2/2007 | Grafenauer et al. |
| 2007/0130872 A1 | 6/2007 | Goodwin |
| 2007/0166516 A1 | 7/2007 | Kim et al. |
| 2007/0175143 A1 | 8/2007 | Pervan et al. |
| 2007/0175144 A1 | 8/2007 | Hakansson |
| 2007/0175148 A1 | 8/2007 | Bergelin et al. |
| 2007/0175156 A1 | 8/2007 | Pervan et al. |
| 2007/0196624 A1 | 8/2007 | Chen et al. |
| 2008/0000179 A1 | 1/2008 | Pervan |
| 2008/0000180 A1 | 1/2008 | Pervan |
| 2008/0000182 A1 | 1/2008 | Pervan |
| 2008/0000183 A1 | 1/2008 | Bergelin et al. |
| 2008/0000186 A1 | 1/2008 | Pervan |
| 2008/0000187 A1 | 1/2008 | Pervan |
| 2008/0000188 A1 | 1/2008 | Pervan |
| 2008/0000189 A1 | 1/2008 | Pervan et al. |
| 2008/0000194 A1 | 1/2008 | Pervan |
| 2008/0000417 A1 | 1/2008 | Pervan et al. |
| 2008/0005989 A1 | 1/2008 | Pervan et al. |
| 2008/0005992 A1 | 1/2008 | Pervan |
| 2008/0005997 A1 | 1/2008 | Pervan |
| 2008/0005998 A1 | 1/2008 | Pervan |
| 2008/0005999 A1 | 1/2008 | Pervan |
| 2008/0008871 A1 | 1/2008 | Pervan |
| 2008/0010924 A1 | 1/2008 | Pietruczynik et al. |
| 2008/0010931 A1 | 1/2008 | Pervan |
| 2008/0010937 A1 | 1/2008 | Pervan |
| 2008/0028707 A1 | 2/2008 | Pervan |
| 2008/0028713 A1 | 2/2008 | Pervan |
| 2008/0029490 A1 | 2/2008 | Martin et al. |
| 2008/0032120 A1 | 2/2008 | Braun |
| 2008/0034701 A1 | 2/2008 | Pervan |
| 2008/0034708 A1 | 2/2008 | Pervan |
| 2008/0041007 A1 | 2/2008 | Pervan et al. |
| 2008/0041008 A1 | 2/2008 | Pervan |
| 2008/0060308 A1 | 3/2008 | Pervan |
| 2008/0063844 A1 | 3/2008 | Chen et al. |
| 2008/0066415 A1 | 3/2008 | Pervan et al. |
| 2008/0075882 A1 | 3/2008 | Hayata |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan et al. |
| 2008/0134614 A1 | 6/2008 | Pervan et al. |
| 2008/0138560 A1 | 6/2008 | Windmoller |
| 2008/0172971 A1 | 7/2008 | Pervan |
| 2008/0241440 A1 | 10/2008 | Bauer |
| 2008/0256890 A1 | 10/2008 | Pervan |
| 2008/0261019 A1 | 10/2008 | Shen |
| 2008/0263975 A1 | 10/2008 | Mead |
| 2008/0311355 A1 | 12/2008 | Chen et al. |
| 2009/0049787 A1 | 2/2009 | Hannig |
| 2009/0078129 A1 | 3/2009 | Cappelle et al. |
| 2009/0120731 A1 | 5/2009 | Thompson et al. |
| 2009/0133353 A1 | 5/2009 | Pervan et al. |
| 2009/0151290 A1 | 6/2009 | Liu |
| 2009/0151866 A1 | 6/2009 | Endert |
| 2009/0155612 A1 | 6/2009 | Pervan et al. |
| 2009/0193748 A1 | 8/2009 | Boo et al. |
| 2009/0208646 A1 | 8/2009 | Kreuder et al. |
| 2009/0235604 A1 | 9/2009 | Cheng et al. |
| 2009/0249733 A1 | 10/2009 | Moebus |
| 2010/0011695 A1 | 1/2010 | Cheng et al. |
| 2010/0092731 A1 | 4/2010 | Pervan et al. |
| 2010/0152361 A1 | 6/2010 | Weaver et al. |
| 2010/0166967 A1 | 7/2010 | Chisaka |
| 2010/0223881 A1 | 9/2010 | Kalwa |
| 2010/0242398 A1 | 9/2010 | Cullen |
| 2010/0260962 A1 | 10/2010 | Chen et al. |
| 2010/0300030 A1 | 12/2010 | Pervan et al. |
| 2010/0319282 A1 | 12/2010 | Ruland |
| 2010/0323187 A1 | 12/2010 | Kalwa |
| 2011/0030303 A1 | 2/2011 | Pervan et al. |
| 2011/0041996 A1 | 2/2011 | Pervan |
| 2011/0056167 A1 | 3/2011 | Nilsson et al. |
| 2011/0104431 A1 | 5/2011 | Niedermaier |
| 2011/0131901 A1 | 6/2011 | Pervan et al. |
| 2011/0131909 A1 | 6/2011 | Hannig |
| 2011/0138722 A1 | 6/2011 | Hannig |
| 2011/0146177 A1 | 6/2011 | Hannig |
| 2011/0154763 A1 | 6/2011 | Bergelin et al. |
| 2011/0167744 A1 | 7/2011 | Whispell et al. |
| 2011/0177354 A1 | 7/2011 | Ziegler et al. |
| 2011/0223342 A1 | 9/2011 | Iyer et al. |
| 2011/0247285 A1 | 10/2011 | Wybo |
| 2011/0247748 A1 | 10/2011 | Pervan et al. |
| 2011/0287237 A1 | 11/2011 | Riebel |
| 2011/0296780 A1 | 12/2011 | Windmoller |
| 2011/0300392 A1 | 12/2011 | Vermeulen |
| 2011/0300393 A1 | 12/2011 | Iio et al. |
| 2011/0318507 A1 | 12/2011 | Meersseman et al. |
| 2012/0003439 A1 | 1/2012 | Chen et al. |
| 2012/0040149 A1 | 2/2012 | Chen et al. |
| 2012/0124932 A1 | 5/2012 | Schulte et al. |
| 2012/0137617 A1 | 6/2012 | Pervan |
| 2012/0216472 A1 | 8/2012 | Martensson |
| 2012/0216947 A1 | 8/2012 | Huber |
| 2012/0266555 A1 | 10/2012 | Cappelle |
| 2012/0276348 A1 | 11/2012 | Clausi et al. |
| 2012/0279154 A1 | 11/2012 | Bergelin et al. |
| 2013/0014890 A1 | 1/2013 | Pervan et al. |
| 2013/0014891 A1 | 1/2013 | Vandevoorde |
| 2013/0047536 A1 | 2/2013 | Pervan |
| 2013/0052437 A1* | 2/2013 | Barth ............... B05D 5/00 428/213 |
| 2013/0095343 A1 | 4/2013 | Arsene et al. |
| 2013/0111758 A1 | 5/2013 | Nilsson et al. |
| 2013/0171377 A1 | 7/2013 | Aravamudan |
| 2013/0269863 A1 | 10/2013 | Pervan |
| 2013/0298487 A1 | 11/2013 | Bergelin et al. |
| 2013/0299454 A1 | 11/2013 | Marxen et al. |
| 2013/0305649 A1 | 11/2013 | Thiers |
| 2014/0017452 A1 | 1/2014 | Pervan et al. |
| 2014/0023832 A1 | 1/2014 | Pervan |
| 2014/0033635 A1 | 2/2014 | Pervan et al. |
| 2014/0069044 A1 | 3/2014 | Wallin |
| 2014/0109507 A1 | 4/2014 | Dossche et al. |
| 2014/0115994 A1 | 5/2014 | Pervan |
| 2014/0141239 A1 | 5/2014 | Ilfrey |
| 2014/0144583 A1 | 5/2014 | Hakansson et al. |
| 2014/0147585 A1 | 5/2014 | Smith |
| 2014/0196618 A1 | 7/2014 | Pervan |
| 2014/0220318 A1 | 8/2014 | Pervan |
| 2014/0237924 A1 | 8/2014 | Nilsson et al. |
| 2014/0283466 A1 | 9/2014 | Boo |
| 2014/0290158 A1 | 10/2014 | Meersseman et al. |
| 2014/0290171 A1 | 10/2014 | Vermeulen |
| 2014/0318061 A1 | 10/2014 | Pervan |
| 2014/0352248 A1 | 12/2014 | Whispell |
| 2014/0356594 A1 | 12/2014 | Chen et al. |
| 2015/0056416 A1 | 2/2015 | Maesen |
| 2015/0072102 A1 | 3/2015 | Dossche et al. |
| 2015/0072111 A1 | 3/2015 | Rischer et al. |
| 2015/0158330 A1 | 6/2015 | Stoffel et al. |
| 2015/0159379 A1 | 6/2015 | Meersseman et al. |
| 2015/0167320 A1 | 6/2015 | Meersseman et al. |
| 2015/0225964 A1 | 8/2015 | Chen et al. |
| 2015/0251486 A1 | 9/2015 | Hannig |
| 2015/0258716 A1 | 9/2015 | Hannig |
| 2016/0016390 A1 | 1/2016 | Lundblad et al. |
| 2016/0052245 A1 | 2/2016 | Chen et al. |
| 2016/0069089 A1 | 3/2016 | Bergelin et al. |

(56) References Cited

U.S. PATENT DOCUMENTS

| | | | |
|---|---|---|---|
| 2016/0082625 A1 | 3/2016 | Luukko et al. |
| 2016/0108624 A1 | 4/2016 | Nilsson et al. |
| 2016/0144433 A1 | 5/2016 | Stoffel |
| 2016/0186318 A1 | 6/2016 | Pervan et al. |
| 2016/0194883 A1 | 7/2016 | Pervan |
| 2016/0194885 A1 | 7/2016 | Whispell et al. |
| 2016/0201324 A1 | 7/2016 | Håkansson et al. |
| 2016/0265234 A1 | 9/2016 | Pervan |
| 2017/0037642 A1 | 2/2017 | Boo |
| 2017/0037645 A1 | 2/2017 | Pervan |
| 2017/0175400 A1 | 6/2017 | Joseffson et al. |
| 2017/0232761 A1 | 8/2017 | Pervan |
| 2017/0241136 A1 | 8/2017 | Kell |
| 2017/0348984 A1 | 12/2017 | Pervan |
| 2017/0350140 A1 | 12/2017 | Bergelin et al. |
| 2018/0094441 A1 | 4/2018 | Boo |
| 2018/0339504 A1* | 11/2018 | Ziegler ............... B32B 37/203 |
| 2019/0091977 A1 | 3/2019 | Lundblad et al. |
| 2019/0211569 A1 | 7/2019 | Boo et al. |

FOREIGN PATENT DOCUMENTS

| | | |
|---|---|---|
| CA | 2 406 991 A1 | 11/2001 |
| CA | 2 252 791 C | 5/2004 |
| CN | 2076142 U | 5/1991 |
| CN | 2106197 U | 6/1992 |
| CN | 2124276 U | 12/1992 |
| CN | 2272915 | 1/1998 |
| CN | 2301491 | 12/1998 |
| CN | 1270263 A | 10/2000 |
| CN | 1482166 A | 3/2004 |
| CN | 2765969 Y | 3/2006 |
| CN | 1911997 A | 2/2007 |
| CN | ZL 200720034739 | 1/2008 |
| CN | ZL 200620075187.2 | 2/2008 |
| CN | 100462398 C | 2/2009 |
| CN | 101367977 A | 2/2009 |
| CN | 101367977 B | 2/2009 |
| CN | 201339298 Y | 11/2009 |
| CN | 101614068 A | 12/2009 |
| CN | 101614068 B | 12/2009 |
| CN | 101767362 A | 7/2010 |
| CN | 101767362 B | 7/2010 |
| CN | 101487336 B | 10/2010 |
| CN | 101955614 A | 1/2011 |
| CN | 101955614 B | 1/2011 |
| CN | 101613503 B | 5/2011 |
| CN | 101698749 B | 10/2011 |
| CN | 202023326 U | 11/2011 |
| CN | 2011/20467334 | 7/2012 |
| CN | 2011/20467683 | 7/2012 |
| CN | 104177817 A1 | 12/2014 |
| DE | 1 081 653 | 5/1960 |
| DE | 1 815 312 A1 | 7/1969 |
| DE | 1 534 802 | 4/1970 |
| DE | 28 24 656 A1 | 1/1979 |
| DE | 134 967 | 4/1979 |
| DE | 28 32 817 A1 | 2/1980 |
| DE | 31 50 352 A1 | 10/1982 |
| DE | 31 35 716 A1 | 6/1983 |
| DE | 33 43 601 A1 | 12/1983 |
| DE | 33 43 601 C2 | 12/1983 |
| DE | 35 38 538 A1 | 5/1987 |
| DE | 39 04 686 C1 | 8/1989 |
| DE | 39 32 980 A1 | 11/1991 |
| DE | 40 20 682 A1 | 1/1992 |
| DE | 42 42 530 A1 | 6/1994 |
| DE | 295 17 995 U1 | 3/1996 |
| DE | 198 54 475 A1 | 7/1999 |
| DE | 299 08 733 U1 | 8/1999 |
| DE | 298 23 681 U1 | 11/1999 |
| DE | 200 02 744 U1 | 9/2000 |
| DE | 200 08 708 U1 | 9/2000 |
| DE | 200 18 817 U1 | 2/2001 |
| DE | 199 44 399 A1 | 4/2001 |
| DE | 100 01 248 A1 | 7/2001 |
| DE | 100 32 204 C1 | 7/2001 |
| DE | 100 06 748 A1 | 8/2001 |
| DE | 202 06 460 U1 | 7/2002 |
| DE | 202 07 844 U | 8/2002 |
| DE | 202 14 532 U1 | 3/2004 |
| DE | 103 16 695 A1 | 10/2004 |
| DE | 103 16 886 A1 | 10/2004 |
| DE | 20 2004 014 160 U1 | 12/2004 |
| DE | 10 2004 011 531 B3 | 11/2005 |
| DE | 198 54 475 B4 | 6/2006 |
| DE | 10 2005 023 661 A1 | 11/2006 |
| DE | 10 2005 061 099 A1 | 3/2007 |
| DE | 10 2006 058 655 A1 | 6/2008 |
| DE | 10 2006 058 655 B4 | 6/2008 |
| DE | 10 2007 046 532 B3 | 10/2008 |
| DE | 20 2008 011 589 U1 | 11/2008 |
| DE | 20 2008 012 001 U1 | 11/2008 |
| DE | 10 2012 005 312 A1 | 9/2013 |
| EP | 0 046 526 A2 | 3/1982 |
| EP | 0 562 402 A1 | 9/1993 |
| EP | 0 611 408 A1 | 12/1993 |
| EP | 0 665 347 A1 | 8/1995 |
| EP | 0 698 126 A1 | 2/1996 |
| EP | 0 611 408 B1 | 9/1996 |
| EP | 0 732 449 A1 | 9/1996 |
| EP | 0 843 763 A1 | 5/1998 |
| EP | 0 865 351 A1 | 9/1998 |
| EP | 0 890 373 A1 | 1/1999 |
| EP | 0 903 451 A2 | 3/1999 |
| EP | 0 919 367 A2 | 6/1999 |
| EP | 0 732 449 B1 | 8/1999 |
| EP | 0 903 451 A3 | 8/1999 |
| EP | 1 024 234 A2 | 8/2000 |
| EP | 1 036 341 A | 9/2000 |
| EP | 0 843 763 B1 | 10/2000 |
| EP | 1 045 083 A1 | 10/2000 |
| EP | 1 061 201 A2 | 12/2000 |
| EP | 1 165 906 | 1/2002 |
| EP | 1 209 199 A1 | 5/2002 |
| EP | 1 165 906 B1 | 8/2002 |
| EP | 1 045 083 B1 | 10/2002 |
| EP | 1 262 607 A1 | 12/2002 |
| EP | 1 262 609 A1 | 12/2002 |
| EP | 1 273 737 A2 | 1/2003 |
| EP | 0 865 351 B1 | 2/2003 |
| EP | 1 357 239 A2 | 10/2003 |
| EP | 1 362 947 A2 | 11/2003 |
| EP | 0 890 373 B1 | 2/2004 |
| EP | 1 357 239 A3 | 7/2004 |
| EP | 1 036 341 B1 | 2/2005 |
| EP | 1 847 385 A1 | 10/2007 |
| EP | 1 938 963 A1 | 7/2008 |
| EP | 1 961 556 A1 | 8/2008 |
| EP | 2 123 476 A2 | 11/2009 |
| EP | 2 189 591 A2 | 5/2010 |
| EP | 2 202 056 A1 | 6/2010 |
| EP | 2 226 201 A1 | 9/2010 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 339 092 A1 | 6/2011 |
| EP | 2 516 768 | 6/2011 |
| EP | 1 847 385 B1 | 9/2011 |
| EP | 2 189 591 A3 | 3/2012 |
| EP | 2 263 867 B1 | 3/2012 |
| EP | 2 789 501 A1 | 10/2014 |
| FR | 1 293 043 A | 5/1962 |
| FR | 2 278 876 A | 2/1976 |
| FR | 2 445 875 A1 | 8/1980 |
| FR | 2 498 666 A1 | 7/1982 |
| FR | 2 557 905 | 7/1985 |
| FR | 2 810 060 A1 | 12/2001 |
| GB | 25 180 | 7/1907 |
| GB | 484 750 | 5/1938 |
| GB | 518 239 A | 2/1940 |

(56) References Cited

FOREIGN PATENT DOCUMENTS

| | | |
|---|---|---|
| GB | 875 327 | 8/1961 |
| GB | 900 958 | 7/1962 |
| GB | 984 170 A | 2/1965 |
| GB | 1 090 450 | 11/1967 |
| GB | 1 189 485 | 4/1970 |
| GB | 1 308 011 | 2/1973 |
| GB | 1 430 423 A | 3/1976 |
| GB | 1 520 964 A | 8/1978 |
| GB | 2 020 998 A | 11/1979 |
| GB | 2 095 814 A | 10/1982 |
| GB | 2 117 813 A | 10/1983 |
| GB | 2 145 371 A | 3/1985 |
| GB | 2 147 856 A | 5/1985 |
| GB | 2 243 381 A | 10/1991 |
| GB | 2 256 023 A | 11/1992 |
| GB | 2 262 940 A | 7/1993 |
| JP | 56-104936 U | 1/1981 |
| JP | 56-131752 A | 10/1981 |
| JP | 57-119056 | 7/1982 |
| JP | 57-157636 U | 10/1982 |
| JP | 59-185346 U | 12/1984 |
| JP | 60-255843 A | 12/1985 |
| JP | 62-127225 | 6/1987 |
| JP | 1-178659 A | 7/1989 |
| JP | 1-202403 A | 8/1989 |
| JP | 1-33702 Y2 | 10/1989 |
| JP | 3-169967 | 7/1991 |
| JP | H05-169534 A | 7/1993 |
| JP | 5-96282 U | 12/1993 |
| JP | 05-318674 A | 12/1993 |
| JP | 06-064108 | 3/1994 |
| JP | 6-39840 B2 | 5/1994 |
| JP | 06-315944 | 11/1994 |
| JP | 7-26467 U | 5/1995 |
| JP | 7-180333 A | 7/1995 |
| JP | 8-086080 A | 4/1996 |
| JP | 8-109734 A | 4/1996 |
| JP | 9-053319 A | 2/1997 |
| JP | 09-254697 | 9/1997 |
| JP | 10-002096 A | 1/1998 |
| JP | 10-219975 A | 8/1998 |
| JP | 11-131771 A | 5/1999 |
| JP | 11-268010 A | 10/1999 |
| JP | 2001-328210 A | 11/2001 |
| JP | 2002-011708 A | 1/2002 |
| JP | 3363976 B2 | 1/2003 |
| KR | 1996-0005785 | 7/1996 |
| KR | 2007/0000322 A | 1/2007 |
| NZ | 225556 | 2/1992 |
| SE | 506 254 C2 | 11/1997 |
| SE | 0000785 A | 9/2001 |
| SE | 0103130 A | 3/2003 |
| WO | WO 89/03753 A1 | 5/1989 |
| WO | WO 90/06232 A1 | 6/1990 |
| WO | WO 90/06970 A1 | 6/1990 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 94/01628 A2 | 1/1994 |
| WO | WO 94/26999 A1 | 11/1994 |
| WO | WO 94/28183 | 12/1994 |
| WO | WO 95/11333 | 4/1995 |
| WO | WO 96/07801 A1 | 3/1996 |
| WO | WO 96/09262 A2 | 3/1996 |
| WO | WO 96/27721 A1 | 9/1996 |
| WO | WO 97/10396 | 3/1997 |
| WO | WO 97/18949 A1 | 5/1997 |
| WO | WO 97/21011 | 6/1997 |
| WO | WO 97/47834 A1 | 12/1997 |
| WO | WO 98/24995 A1 | 6/1998 |
| WO | WO 98/38401 A1 | 9/1998 |
| WO | WO 98/58142 A1 | 12/1998 |
| WO | WO 99/17930 A1 | 4/1999 |
| WO | WO 99/58254 A1 | 11/1999 |
| WO | WO 99/66151 A1 | 12/1999 |
| WO | WO 99/66152 A1 | 12/1999 |
| WO | WO 00/17467 A1 | 3/2000 |
| WO | WO 00/20705 A1 | 4/2000 |
| WO | WO 00/22225 A1 | 4/2000 |
| WO | WO 00/44984 A1 | 8/2000 |
| WO | WO 00/47841 A1 | 8/2000 |
| WO | WO 00/66856 A1 | 11/2000 |
| WO | WO 01/00406 A1 | 1/2001 |
| WO | WO 01/02669 A1 | 1/2001 |
| WO | WO 01/02670 A1 | 1/2001 |
| WO | WO 01/02671 A1 | 1/2001 |
| WO | WO 01/02672 A1 | 1/2001 |
| WO | WO 01/47717 A1 | 7/2001 |
| WO | WO 01/47726 A1 | 7/2001 |
| WO | WO 01/48331 A1 | 7/2001 |
| WO | WO 01/48332 A1 | 7/2001 |
| WO | WO 01/48333 A1 | 7/2001 |
| WO | WO 01/51732 A1 | 7/2001 |
| WO | WO 01/51733 A1 | 7/2001 |
| WO | WO 01/53628 A1 | 7/2001 |
| WO | WO 01/66877 A1 | 9/2001 |
| WO | WO 01/75247 A1 | 10/2001 |
| WO | WO 01/77461 A1 | 10/2001 |
| WO | WO 01/88306 A1 | 11/2001 |
| WO | WO 01/92037 A2 | 12/2001 |
| WO | WO 02/055809 A1 | 7/2002 |
| WO | WO 02/055810 A1 | 7/2002 |
| WO | WO 02/060691 A1 | 8/2002 |
| WO | WO 02/092342 A1 | 11/2002 |
| WO | WO 03/012224 A1 | 2/2003 |
| WO | WO 03/016655 A1 | 2/2003 |
| WO | WO 03/025307 A1 | 3/2003 |
| WO | WO 03/035396 A1 | 5/2003 |
| WO | WO 03/078761 A1 | 9/2003 |
| WO | WO 03/083234 A1 | 10/2003 |
| WO | WO 03/089736 A1 | 10/2003 |
| WO | WO 2004/005648 A1 | 1/2004 |
| WO | WO 2004/016877 A1 | 2/2004 |
| WO | WO 2004/053257 A1 | 6/2004 |
| WO | WO 2004/085765 A1 | 10/2004 |
| WO | WO 2004/053257 A8 | 12/2004 |
| WO | WO 2005/051637 A2 | 6/2005 |
| WO | WO 2005/068747 A1 | 7/2005 |
| WO | WO 2005/116361 A1 | 12/2005 |
| WO | WO 2006/013469 A1 | 2/2006 |
| WO | WO 2006/043893 A1 | 4/2006 |
| WO | WO 2006/133690 A1 | 12/2006 |
| WO | WO 2007/015669 A2 | 2/2007 |
| WO | WO 2007/015669 A3 | 2/2007 |
| WO | WO 2007/020088 A1 | 2/2007 |
| WO | WO 2007/081267 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/008824 A1 | 1/2008 |
| WO | WO 2008/122668 A1 | 10/2008 |
| WO | WO 2008/133377 A1 | 11/2008 |
| WO | WO 2008/142538 A2 | 11/2008 |
| WO | WO 2009/061279 A1 | 5/2009 |
| WO | WO 2009/065769 A2 | 5/2009 |
| WO | WO 2009/065769 A3 | 5/2009 |
| WO | WO 2009/116926 A1 | 9/2009 |
| WO | WO 2009/124704 A1 | 10/2009 |
| WO | WO 2010/015516 A2 | 2/2010 |
| WO | WO 2010/015516 A3 | 2/2010 |
| WO | WO 2010/023042 A1 | 3/2010 |
| WO | WO 2010/028901 A1 | 3/2010 |
| WO | WO 2010/081532 A1 | 7/2010 |
| WO | WO 2010/081860 A1 | 7/2010 |
| WO | WO 2010/087752 A2 | 8/2010 |
| WO | WO 2011/012104 A2 | 2/2011 |
| WO | WO 2011/012104 A3 | 2/2011 |
| WO | WO 2011/028171 A1 | 3/2011 |
| WO | WO 2011/033956 A1 | 3/2011 |
| WO | WO 2011/057824 A1 | 5/2011 |
| WO | WO 2011/077311 A2 | 6/2011 |
| WO | WO 2011/082491 A1 | 7/2011 |
| WO | WO 2011/087422 A1 | 7/2011 |

(56) References Cited

FOREIGN PATENT DOCUMENTS

| | | | | |
|---|---|---|---|---|
| WO | WO 2011/129755 A2 | 10/2011 | | |
| WO | WO 2011/129757 A1 | 10/2011 | | |
| WO | WO 2011129755 A2 * | 10/2011 | ............ | B32B 33/00 |
| WO | WO 2011/141849 A2 | 11/2011 | | |
| WO | WO 2011/141849 A3 | 11/2011 | | |
| WO | WO 2012/037950 A1 | 3/2012 | | |
| WO | WO 2012/061300 A2 | 5/2012 | | |
| WO | WO 2012/076608 A1 | 6/2012 | | |
| WO | WO 2013/026559 A1 | 2/2013 | | |
| WO | WO 2013/079950 A1 | 6/2013 | | |
| WO | WO 2013079950 A1 * | 6/2013 | ............ | B32B 27/08 |
| WO | WO 2013/139460 A1 | 9/2013 | | |
| WO | WO 2014/060402 A1 | 4/2014 | | |
| WO | WO 2016/010471 A1 | 1/2016 | | |
| WO | WO 2016/010472 A1 | 1/2016 | | |

OTHER PUBLICATIONS

U.S. Appl. No. 15/061,303, Pervan et al.
International Search Report issued in PCT/SE2015/050783, dated Oct. 20, 2015, ISA/SE Patent-och registreringsverket, Stockholm, SE, 6 pages.
Sichuan Jieyang Building Materials Co., Ltd., "PVC Flooring Planks With Good Quality," China PVC Flooring;3 pages, http://harjorflooring.en.made-in-china.com/product/vXFxYDICrnks/China-PVC-Flooring-Planks-with-Good-Quality.html, 2013.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE.
Odian, George, "Principles of Polymerization," 1991, 3$^{rd}$ Edition, 5 pages incl. pp. 122-123, John Wiley & Sons, Inc., New York, NY, USA.
Håkansson, Niclas, et al., U.S. Appl. No. 14/994,593 entitled "Method to Produce a Wear Resistant Layer with Different Gloss Levels," filed Jan. 13, 2016.
Pervan, Darko, et al., U.S. Appl. No. 15/061,303 entitled "Powder Overlay," filed Mar. 4, 2016.
U.S. Appl. No. 13/912,587, Darko Pervan and Göran Ziegler, filed Jun. 7, 2013, (cited herein as US Patent Application Publication No. 2013/0269863 A1 of Oct. 17, 2013).
U.S. Appl. No. 13/943,464, Marcus Bergelin and Mats Nilsson, filed Jul. 16, 2013, (cited herein as US Patent Application Publication No. 2013/0298487 A1 of Nov. 14, 2013)
U.S. Appl. No. 14/050,597, Darko Pervan and Tony Pervan, filed Oct. 10, 2013, (cited herein as US Patent Application Publication No. 2014/0033635 A1 of Feb. 6, 2014)
U.S. Appl. No. 14/272,895, Mats Nilsson and Per Nygren, filed May 8, 2014, (Cited herein as US Patent Application Publication No. 2014/0237924 A1 of Aug. 28, 2014).
U.S. Appl. No. 14/462,951, Hao A. Chen and Richard Judd, filed Aug. 19, 2014, (Cited herein as US Patent Application Publication No. 2014/0356594 A1 of Dec. 4, 2014).
U.S. Appl. No. 14/693,232, Hao A. Chen and Richard Judd, filed Apr. 22, 2015, (Cited herein as US Patent Application Publication No. 2015/0225964 A1 of Aug. 13, 2015).
U.S. Appl. No. 14/790,774, Christer Lundblad, Niclas Håkansson and Göran Ziegler, filed Jul. 2, 2015.
U.S. Appl. No. 14/932,126, Hao A. Chen and Richard Judd, filed Nov. 4, 2015.
U.S. Appl. No. 14/946,080, Marcus Bergelin and Mats Nilsson, filed Nov. 19, 2015.
U.S. Appl. No. 14/790,774, Lundblad et al.
U.S. Appl. No. 14/932,126, Chen et al.
U.S. Appl. No. 14/946,080, Bergelin et al.
Pervan, Darko (Author)/Valinge Innovation, Technical Disclosure entitled "VA073a Zip Loc," Sep. 13, 2011, IP.com No. IPCOM000210869D, IP.com PriorArtDatabase, 36 pages.
Composite Panel Report: *Laminate Flooring, Wood Digest*, Sep. 1999, p. 37, Cygnus Publishing, Inc., & Affiliates, Fort Atkinson, WI, 6 pages.
Wilkes, et al., "Table 5.3 Typical properties of General Purpose Vinyl Plastic Products," PVC Handbook, ISBN 3-446-22714-8, 1988, p. 184.
"Plasticizer," dated Feb. 29, 2012, from Wikipedia (6 pages).
"Polyvinyl chloride," dated Feb. 29, 2012, from Wikipedia (13 pages).
"Reference: Polymer Properties," Polymer Products from Aldrich, dated 1993, (2 pages).
PVC Resin-Solution Viscosity-K Value Chart, Plastemart, (1 page).
Laminatfußböden, Technik and Technologien, Laminatforum, 1999, pp. 23-24.
Mobil oil/Holzwerkstoff-Symposium, Stuttgart 1998, Volker Kettler, Witex AG, pp. 1-24.
Ullmann's Encyclopedia of Industrial Chemistry, 1996, vol. A28, pp. 345-350.
Holzwerkstoffe, Herstellung und Verarbeitung; Platten, Beschichtungsstoffe, Formteile, Türen, Möbel; Von Hansgert Soiné; DRW-Verlag, 1995 (51 pages).
Excerpt from Bodenwanddecke, "USA: Das sind die Trends," Apr. 2000, p. 7.
Lundblad, Christer, et al., U.S. Appl. No. 14/790,774 entitled "Method to Produce a Thermoplastic Wear Resistant Foil," filed Jul. 2, 2015.
Chen, Hao A , et al., U.S. Appl. No. 14/932,126 entitled "Thermoplastic Planks and Methods for Making the Same," filed Nov. 4, 2015.
Bergelin, Marcus, et al., U.S. Appl. No. 14/946,080, entitled "Resilient Groove," filed Nov. 19, 2015.
Extended European Search Report issued in EP 15822782.7, dated Nov. 17, 2017, European Patent Office, Munich, DE, 8 pages.
U.S. Appl. No. 16/113,333, Lundblad et al.
Lundblad, Christer, et al., U.S. Appl. No. 16/113,333 entitled "Method to Produce a Thermoplastic Wear Resistant Foil," filed Aug. 27, 2018.
U.S. Appl. No. 16/416,846, Pervan et al.
Pervan, Darko, et al., U.S. Appl. No. 16/416,846 entitled "Powder Overlay," filed May 20, 2019.
Extended European Search Report issued in EP15822018.6, dated Nov. 17, 2017, European Patent Office, Munich, DE, 8 pages.

* cited by examiner

METHOD TO PRODUCE A THERMOPLASTIC WEAR RESISTANT FOIL

FIELD OF THE DISCLOSURE

The present disclosure relates to a method to produce a thermoplastic wear resistant foil, a method to produce a building panel including such a thermoplastic wear resistant foil and a building panel.

TECHNICAL BACKGROUND

In recent years, so-called Luxury Vinyl Tiles and Planks (LVT) have gained increasing success. These types of floor panels usually comprise a thermoplastic core, a thermoplastic décor layer arranged on the core, a transparent wear layer on the décor layer, and a coating applied on the wear layer. The thermoplastic material is often PVC. The wear layer is conventionally a PVC foil, for example, having a thickness of 0.2-0.7 mm. The coating applied on the wear layer is conventionally a UV curing polyurethane coating. The wear layer together with the coating provides the wear resistance of the floor panel and protects the décor layer.

However, when subjecting floor panels to wear, it has been shown that the coating and the wear layer are relatively easily worn down, or at least worn such that the appearance of the wear layer is affected, such as having scratches and/or not being transparent any longer. Compared to a conventional laminate floor panel, the wear resistance of a LVT floor panel is inferior. However, LVT floors offer several advantages over, for example, laminate floors, such as deep embossing, dimensional stability related to humidity, moisture resistance and sound absorbing properties.

It is therefore desirable to provide a LVT product having improved wear resistance. It is also desirable to simplify the build up of LVT product.

It is known from US 2008/0063844 to apply a surface coating including aluminium oxide on a resilient floor covering. The coating is a wet coating.

WO 2013/079950 discloses an anti-skid floor covering comprising at least two transparent polymer layers, wherein particles of an aggregate material having an average particle size of between about 0.05 mm to about 0.8 mm are located between and/or within the two or more polymer layers. The particles improve the slip resistance of the floor covering.

SUMMARY

It is an object of at least embodiments of the present disclosure to provide an improvement over the above described techniques and known art.

A further object of at least embodiments of the present disclosure is to improve the wear resistance of LVT floorings.

A further object of at least embodiments of the present disclosure is to simplify the build up of LVT floorings.

At least some of these and other objects and advantages that will be apparent from the description have been achieved by a method to produce a wear resistant foil according to a first aspect. The method includes a first foil comprising a first thermoplastic material, applying wear resistant particles and a second thermoplastic material on the first foil, and adhering the first foil to the second thermoplastic material and the wear resistant particles to form a wear resistant foil.

The first and the second thermoplastic material may be thermoplastic materials of different type, or may be thermoplastic material of the same type.

An advantage of at least embodiments of the present disclosure is that a wear resistant foil having improved wear resistance is provided. By including wear resistant particles in the wear resistant foil, the wear resistant particles provide additional wear resistance to the thermoplastic materials of the first and the second foil. The wear resistance of the foil is improved compared to a conventional wear layer of LVT products.

Furthermore, conventional coatings, for example, a UV curable PU coating conventionally applied on the wear layer, may be replaced by using the wear resistant foil according to the disclosure instead. A conventional coating step may be replaced by arranging a single foil. Thereby, the production process is simplified and the number of steps in the production process is reduced by arranging a wear resistant foil having improved wear resistant properties instead of several layers or coatings.

By using different thermoplastic material in the first foil and the second thermoplastic material applied on the first foil, it is possible to benefit from different thermoplastic material having different properties. The desired properties of the material of the first foil may differ from the desired properties of the thermoplastic material applied on the first foil. For the layer formed by the second thermoplastic material and the wear resistant particles arranged on the first foil, properties such as stain resistance and scratch resistance are important, and the choice of the thermoplastic material can be chosen to match these criteria. Usually, suitable thermoplastic material for forming the layer applied on the first foil may be more expensive compared to thermoplastic material used as, for example, in printed film or as core material. By only using such thermoplastic material in the layer arranged on the first foil, the cost of the wear resistant foil can be controlled. Further, the layer formed by the second thermoplastic material can have a layer thickness being less than a layer thickness of the first foil. By choosing different thermoplastic materials for the first foil and the overlying layer, the thermoplastic materials can be used in an efficient and cost effective manner. By adjusting the layer thicknesses, the materials can be used in an even more efficient manner.

The object of the wear resistant particles is to provide wear resistance of the foil when being worn, not to provide slip resistance.

The second thermoplastic material may be in powder form when applied on the first foil.

The second thermoplastic material may be in powder form when adhered to the first foil, such as, for example, when being pressed to the first foil.

The first foil, the second thermoplastic material and the wear resistant particles may be adhered to each other by pressing the first foil, the wear resistant particles and the second thermoplastic material together.

The wear resistant foil is preferably transparent, or at least substantially transparent, for example, having a light transmittance index exceeding 80%, preferably exceeding 90%.

Thereby, any decorative layer or decorative print is visible through the wear resistant foil. Preferably, the wear resistant foil does not influence of the impression of any decorative layer or decorative print arranged beneath the wear resistant foil. The wear resistant foil is preferably non-pigmented.

The wear resistant particles may be enclosed by the first foil and the second thermoplastic material after being adhered to each other. The wear resistant particles may be encapsulated by the second foil. Preferably, the wear resistant particles do not protrude from a surface of a layer formed by the second thermoplastic material after being adhered to the first layer. If the wear resistant particles protrude beyond the surface of the layer formed by the second thermoplastic material, the wear resistance foil will cause wear on items placed on the wear resistance foil. For example, when the wear resistant foil is used a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the thermoplastic material is to provide wear resistance when the second foil is worn, not to provide slip resistance.

The wear resistant particles and the second thermoplastic material may be applied as a mix. As an alternative or complement, the wear resistant particles and the second thermoplastic material may be applied separately.

The second thermoplastic material may be applied in molten form. The second thermoplastic material may be applied in an extrusion process such as extrusion lamination or extrusion coating on the first foil.

The first thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The second thermoplastic material may be or comprise polyvinyl chloride (PVC) or polyurethane (PU). The second thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The first foil may substantially consist of the thermoplastic material, preferably polyvinyl chloride, and optionally additives.

Additives may be plasticizers, stabilizers, lubricants, degassing agents, coupling agents, compatibilizers, cross-linking agents, etc.

The first foil may be a decorative foil. The first foil may be printed, for example by digital printing, direct printing, rotogravure printing, etc.

The second thermoplastic material may be or comprise polyvinyl chloride (PVC) or polyurethane (PU).

By arranging the second thermoplastic material being or comprising polyurethane, no additional polyurethane containing coating has to be provided on top of the wear resistant foil. Thereby, the layered structure of a LVT product may be simplified. Furthermore, compared to for example a conventional wear layer substantially consisting of PVC, a wear resistant foil comprising an upper portion of polyurethane (PU) obtains improved chemical resistance. Its scratch resistance and micro-scratch resistance are also improved. An upper layer of polyurethane (PU) also provides improved resistance against black heel mark. An additional advantage is that curable polyurethane, such as UV curable polyurethane, shrinks when curing. By pressing a thermoplastic polyurethane (PU) material, no, or at least reduced, such shrinking occurs.

In one embodiment, the first thermoplastic material may be or comprises polyvinyl chloride (PVC) and the second thermoplastic material comprises polyurethane (PU). Thereby, a wear resistant foil having the properties of both polyvinyl chloride (PVC) and polyurethane (PU) is provided.

The wear resistant particles comprise aluminium oxide. The wear resistant may comprise carborundum, quartz, silica, glass, glass beads, glass spheres, silicon carbide, diamond particles, hard plastics, reinforced polymers and organics.

The wear resistant particles may have an average particle size of less than 45 µm.

The wear resistant particles may have a refractive index similar to the refractive index of the second thermoplastic material. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

A layer formed by the second thermoplastic material and the wear resistant particles may have a thickness being less than 75 µm, for example, such as about 50 µm, after being adhered to the first foil, for example, by pressing.

The wear resistant particles may have an average particle size being less than the thickness of the layer formed by the second thermoplastic material and the wear resistant particles. The wear resistant particles may have an average particle size being larger than the thickness of the layer formed by the second thermoplastic material and the wear resistant particles. However, during pressing, the wear resistant particles are pressed into the first foil such that the wear resistant particles do not protrude beyond an upper surface of the layer formed by the second thermoplastic material and the wear resistant particles after pressing, although the wear resistant particles having an average particle size exceeding the thickness of the layer formed by the second thermoplastic material and the wear resistant particles.

The ratio between the size of the wear resistant particles and the thickness of the layer formed by the second thermoplastic material and the wear resistant particles may be less than 1.5:1.

The thickness of the layer formed by the second thermoplastic material and the wear resistant particles may be less than the thickness of the first foil.

The method may further comprise applying scratch resistant particles on the first foil, or together with the second thermoplastic material. The scratch resistant particles may be or comprise nano-sized silica particles, preferably fused silica particles. The scratch resistant particles may be or comprise aluminium oxide.

According to a second aspect, a method of forming a building panel is provided. The method comprises applying a wear resistant foil produced according to the first aspect on a core, and applying pressure to the wear resistant foil and the core for forming a building panel.

The core may be provided with a decorative layer. The core may be provided with a print on a surface of the core. The wear resistant foil may be arranged on the decorative layer, or on the print. Alternatively, the first foil of the wear resistant foil may be a decorative layer.

The core may comprise a third thermoplastic material.

The first, second and third thermoplastic material may be thermoplastic materials of different types, or may be the same type of thermoplastic material. The first, second and third thermoplastic material may be or comprise any one of the follow group: polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be a thermoplastic core, a WPC (Wood Plastic Composite), etc. The core may be provided with several layers. The core may be foamed.

The core may be a wood-based board or a mineral board. The core may in embodiments be HDF, MDF, particleboard, OSB, Wood Plastic Composite (WPC).

The decorative layer may be a thermoplastic foil. The decorative layer may comprise any of the thermoplastic material listed above.

According to a third aspect, a method to produce a building panel is provided. The method includes providing a core, applying a first foil comprising a first thermoplastic material on the core, applying wear resistant particles and a second thermoplastic material on the first foil, and adhering the core to the first foil to the second thermoplastic material and the wear resistant particles to each other to form a building panel.

The first and the second thermoplastic material may be thermoplastic materials of different type, or may be thermoplastic material of the same type.

In one embodiment, the wear resistant foil is produced in connection with forming the building panel. The wear resistant foil may be laminated together when laminating any other layer, for example a decorative layer, a balancing layer, etc., to the core.

An advantage of at least embodiments of the present disclosure is that a wear resistant foil having improved wear resistance is provided. By including wear resistant particles in the wear resistant foil, the wear resistant particles provide additional wear resistance to the thermoplastic materials of the first and the second foil. The wear resistance of the foil is improved compared to a conventional wear layer of LVT products.

Furthermore, conventional coatings, for example a UV curable PU coating conventionally applied on the wear layer, may be replaced by using the wear resistant foil according to the disclosure instead. A conventional coating step may be replaced by arranging a single foil. Thereby, the production process is simplified and the number of steps in the production process is reduced by arranging a wear resistant foil having improved wear resistant properties instead of several layers or coatings.

By using different thermoplastic material in the first foil and in the second thermoplastic material applied on the first foil, it is possible to benefit from different thermoplastic material having different properties. The desired properties of the thermoplastic material of the first foil may differ from the desired properties of the second thermoplastic material applied on the first foil. For the layer formed by the second thermoplastic material and the wear resistant particles arranged on the first foil, properties such as stain resistance and scratch resistance are important, and the choice of the thermoplastic material can be chosen to match these criteria. Usually, suitable thermoplastic material for forming the layer applied on the first foil may be more expensive compared to thermoplastic material used as, for example, in printed film or as core material. By only using such thermoplastic material in the layer arranged on the first foil, the cost of the wear resistant foil can be controlled. Further, the layer formed by the second thermoplastic material can have a layer thickness being less than a layer thickness of the first foil. By choosing different thermoplastic materials for the first foil and the overlying layer, the thermoplastic materials can be used in an efficient and cost effective manner. By adjusting the layer thicknesses, the materials can be used in an even more efficient manner.

The object of the wear resistant particles is to provide wear resistance of the foil when being worn, not to provide slip resistance.

The second thermoplastic material may be in powder form when applied on the first foil.

The wear second thermoplastic material may be in powder form when adhered to the first foil, such as, for example, when pressed to the first foil.

The first foil, the second thermoplastic material and the wear resistant particles may be adhered to each other by pressing the first foil, the wear resistant particles and the second thermoplastic material together.

The first foil together with the wear resistant particles and the second thermoplastic material form a wear resistant foil, preferably being transparent, or at least substantially transparent, for example, having a light transmittance index exceeding 80%, preferably exceeding 90%. Thereby, any decorative layer or decorative print is visible through the wear resistant foil. Preferably, the wear resistant foil does not influence of the impression of any decorative layer or decorative print arranged beneath the wear resistant foil. The wear resistant foil is preferably non-pigmented.

The wear resistant particles may be enclosed by the first foil and the second thermoplastic material after being adhered to each other.

Preferably, the wear resistant particles do not protrude from a surface of a layer formed by the second thermoplastic material opposite the first foil after pressing. If the wear resistant particles protrude beyond the surface of the second thermoplastic material, the wear resistance foil will cause wear on items placed on the wear resistance foil. For example, when the wear resistant foil is used a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the thermoplastic material is to provide wear resistance when the second thermoplastic material is worn, not to provide slip resistance.

The wear resistant particles and the second thermoplastic material may be applied as a mix. As an alternative or complement, the wear resistant particles and the second thermoplastic material may be applied separately.

The second thermoplastic material may be applied in molten form. The second thermoplastic material may be applied in an extrusion process such as extrusion lamination or extrusion coating on the first foil.

The first thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The second thermoplastic material may be or comprise polyvinyl chloride (PVC) or polyurethane (PU). The second thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In one embodiment, the first thermoplastic material comprises polyvinyl chloride (PVC) and the second thermoplastic material comprises polyurethane (PU).

The wear resistant particles may preferably comprise aluminium oxide. The wear resistant particles may comprise aluminium oxide such as corundum, carborundum, quartz, silica, glass, glass beads, glass spheres, silicon carbide, diamond particles, hard plastics, reinforced polymers and organics, or combinations thereof.

The wear resistant particles may have an average particle size of less than 45 µm.

The wear resistant particles may have a refractive index similar to the refractive index of the second thermoplastic material. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

A layer formed by the second thermoplastic material and the wear resistant particles may have a thickness being less than 75 µm, for example, such as about 50 µm, after being adhered to each other.

The wear resistant particles may have an average particle size being less than the thickness of the layer formed by the second thermoplastic material and the wear resistant particles. The wear resistant particles may have an average particle size being larger than the thickness of the layer formed by the second thermoplastic material and the wear resistant particles. However, during pressing, the wear resistant particles are pressed into the first foil such that the wear resistant particles do not protrude beyond an upper surface of the layer formed by the second thermoplastic material and the wear resistant particles after pressing, although the wear resistant particles having an average particle size exceeding the thickness of the layer formed by the second thermoplastic material and the wear resistant particles.

The ratio between the size of the wear resistant particles and the thickness of the layer formed by the second thermoplastic material and the wear resistant particles may be less than 1.5:1.

The thickness of the layer formed by the second thermoplastic material and the wear resistant particles may be less than the thickness of the first foil.

The method may further comprise applying scratch resistant particles on the first foil. Alternatively, or as a complement, the scratch particles may be applied together with the second thermoplastic material. The scratch resistant particles may be or comprise nano-sized silica particles, preferably fused silica particles. The scratch resistant particles may be or comprise aluminium oxide.

The core may comprise a third thermoplastic material.

The first, second and third thermoplastic material may be thermoplastic materials of different types, or may be the same type of thermoplastic material.

The third thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be a thermoplastic core, a WPC (Wood Plastic Composite), etc. The core may be provided with several layers. The core may be foamed.

The core may be a wood-based board or a mineral board. The core may in embodiments be HDF, MDF, particleboard, OSB, Wood Plastic Composite (WPC).

A decorative layer may be arranged on the core. In one embodiment, the method may comprise applying a decorative layer prior to applying the first foil. The decorative layer may be a thermoplastic layer. The decorative layer may be a wood powder layer comprising a thermosetting binder and lignocellulosic or cellulosic particles. The decorative layer may be a thermoplastic layer applied as a powder, preferably comprising a print printed into the thermoplastic material in powder form. The decorative layer may be a wood veneer layer, a cork layer or a decorative paper.

In one embodiment, the first foil is arranged directly on the core. The core may be provided with a print, and the first foil is arranged on the print. Alternatively, or as a complement, the first foil may be a decorative foil. The first foil may be printed, for example by digital printing, direct printing, rotogravure, etc. Preferably, the print is provided on a surface of the first foil facing the core.

The method may further comprise applying a coating on the wear resistant foil. The coating may comprise acrylate or methacrylate monomer or acrylate or methacrylate oligomer. The coating may be radiation curing, such as UV curing or electron beam curing.

According a fourth aspect, a method to produce a wear resistant foil is provided. The method comprises providing a carrier, applying wear resistant particles and a second thermoplastic material on the carrier, and adhering the wear resistant particles and the second thermoplastic material to each other to form a wear resistant foil.

Embodiments of the fourth aspect all the advantages of the first aspect, which previously has been discussed, whereby the previous discussion is applicable also for the building panel.

The second thermoplastic material may be in powder form when applied on the carrier.

The wear second thermoplastic material may be in powder form when adhered to the carrier, such as, for example, when pressed to the carrier.

The first foil, the second thermoplastic material and the wear resistant particles may be adhered to each other by pressing the first foil, the wear resistant particles and the second thermoplastic material together.

The wear resistant foil is preferably transparent, or at least substantially transparent, for example, having a light transmittance index exceeding 80%, preferably exceeding 90%. Thereby, any decorative layer or decorative print is visible through the wear resistant foil. Preferably, the wear resistant foil does not influence of the impression of any decorative layer or decorative print arranged beneath the wear resistant foil. The wear resistant foil is preferably non-pigmented.

The wear resistant particles may be enclosed by the first foil and the second thermoplastic material after being adhered to each other.

Preferably, the wear resistant particles do not protrude from a surface of a layer formed by the second thermoplastic material after being adhered to the first foil. If the wear resistant particles protrude beyond the surface of the layer formed by the second thermoplastic material, the wear resistance foil will cause wear on items placed on the wear resistance foil. For example, when the wear resistant foil is used a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the second thermoplastic material is to provide wear resistance when the second foil is worn, not to provide slip resistance.

The wear resistant particles and the second thermoplastic material may be applied as a mix. As an alternative or complement, the wear resistant particles and the second thermoplastic material may be applied separately.

The second thermoplastic material may be applied in molten form. The second thermoplastic material may be applied in an extrusion process such as extrusion lamination or extrusion coating on the carrier.

In one embodiment, the carrier may be a first foil comprising a first thermoplastic material as discussed above in respect of the third aspect.

The carrier may be a substrate.

In one embodiment, the carrier may be a temporary carrier such as a release foil or conveyor means.

In one embodiment, the carrier may be a core. The core may be a thermoplastic core, a Wood Plastic Composite (WPC), a wood-based board or a mineral board. The step of adhering may comprise adhering the carrier to the second thermoplastic material and the wear resistant particles.

The second thermoplastic material may be or comprise polyvinyl chloride (PVC) or polyurethane (PU).

The method may further comprise releasing the wear resistant foil from the carrier.

The wear resistant particles may comprise aluminium oxide. The wear resistant may comprise carborundum, quartz, silica, glass, glass beads, glass spheres, silicon carbide, diamond particles, hard plastics, reinforced polymers and organics.

The wear resistant particles may have an average particle size of less than 45 µm.

The wear resistant particles may have a refractive index similar to the refractive index of the second thermoplastic material. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

A layer formed by the second thermoplastic material and the wear resistant particles may have a thickness being less than 75 µm, for example, such as about 50 µm, after being adhered to each other.

The wear resistant particles may have an average particle size being less than the thickness of the layer formed by the second thermoplastic material and the wear resistant particles. The wear resistant particles may have an average particle size being larger than the thickness of the layer formed by the second thermoplastic material and the wear resistant particles. However, during pressing, the wear resistant particles are pressed into the carrier such that the wear resistant particles do not protrude beyond an upper surface of the layer formed by the second thermoplastic material and the wear resistant particles after pressing, although the wear resistant particles having an average particle size exceeding the thickness of the layer formed by the second thermoplastic material and the wear resistant particles.

The ratio between the size of the wear resistant particles and the thickness of the layer formed by the second thermoplastic material and the wear resistant particles may be less than 1.5:1.

According a fifth aspect, a building panel is provided. The building panel comprises a core, a wear resistant foil arranged on a surface of the core, wherein the wear resistant foil comprises a second thermoplastic material and wear resistant particles substantially homogenously distributed in said second thermoplastic material.

Embodiments of the fifth aspect incorporate all the advantages of the first, which previously has been discussed, whereby the previous discussion is applicable also for the building panel.

The wear resistant foil is preferably transparent, or at least substantially transparent, for example, having a light transmittance index exceeding 80%, preferably exceeding 90%. Thereby, any decorative layer or decorative print is visible through the wear resistant foil. Preferably, the wear resistant foil does not influence of the impression of any decorative layer or decorative print arranged beneath the wear resistant foil. The wear resistant foil is preferably non-pigmented.

The wear resistant particles may be enclosed by the second thermoplastic material.

Preferably, the wear resistant particles do not protrude from a surface of a layer formed by the second thermoplastic material. If the wear resistant particles protrude beyond the surface of the second foil, the wear resistance foil will cause wear on items placed on the wear resistance foil. For example, when the wear resistant foil is used a top surface of a flooring, protruding wear resistant particles will cause wear on socks, shoes, etc. Further, protruding wear resistant particles would cause a rough and/or harsh surface of the wear resistant foil, as provided by a slip resistant surface. The aim of the wear resistant particles enclosed by the thermoplastic material is to provide wear resistance when the second foil is worn, not to provide slip resistance.

The wear resistant foil may further comprise a first foil comprising a first thermoplastic material.

The first thermoplastic material may be or comprise polyvinyl chloride (PVC). The first thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The second thermoplastic material may be or comprise polyvinyl chloride (PVC) or polyurethane (PU). The second thermoplastic material may be or comprise polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The wear resistant particles may preferably comprise aluminium oxide. The wear resistant particles may comprise aluminium oxide, carborundum, quartz, silica, glass, glass beads, glass spheres, silicon carbide, diamond particles, hard plastics, reinforced polymers and organics, or a combination thereof.

The wear resistant particles may have an average particle size of less than 45 µm.

The wear resistant particles may have a refractive index similar to the refractive index of the second thermoplastic material. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

A layer formed by the second thermoplastic material and the wear resistant particles may have a thickness being less than 75 µm, for example, such as about 50 µm, after being adhered.

The wear resistant particles may have an average particle size being less than the thickness of the layer formed by the second thermoplastic material and the wear resistant particles. The wear resistant particles may have an average particle size being larger than the thickness of the layer formed by the second thermoplastic material and the wear resistant particles. However, during pressing, the wear resistant particles are pressed into the core or any intermediate layer such as a first foil such that the wear resistant particles do not protrude beyond an upper surface of the layer formed by the second thermoplastic material and the wear resistant particles after pressing, although the wear resistant particles having an average particle size exceeding the thickness of the layer formed by the second thermoplastic material and the wear resistant particles.

The ratio between the size of the wear resistant particles and the thickness of the layer formed by the second thermoplastic material and the wear resistant particles may be less than 1.5:1.

The thickness of the layer formed by the second thermoplastic material and the wear resistant particles may be less than the thickness of the first foil.

The building panel may further comprise a decorative layer arranged on the core, wherein the wear resistant foil is arranged on the decorative layer.

The core may comprise a third thermoplastic material. The third thermoplastic material may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The core may be a thermoplastic core, a Wood Plastic Composite (WPC), a wood-based board or a mineral board.

BRIEF DESCRIPTION OF THE DRAWINGS

The present disclosure will by way of example be described in more detail with reference to the appended schematic drawings, which show embodiments of the present disclosure.

DETAILED DESCRIPTION

Figure 1:
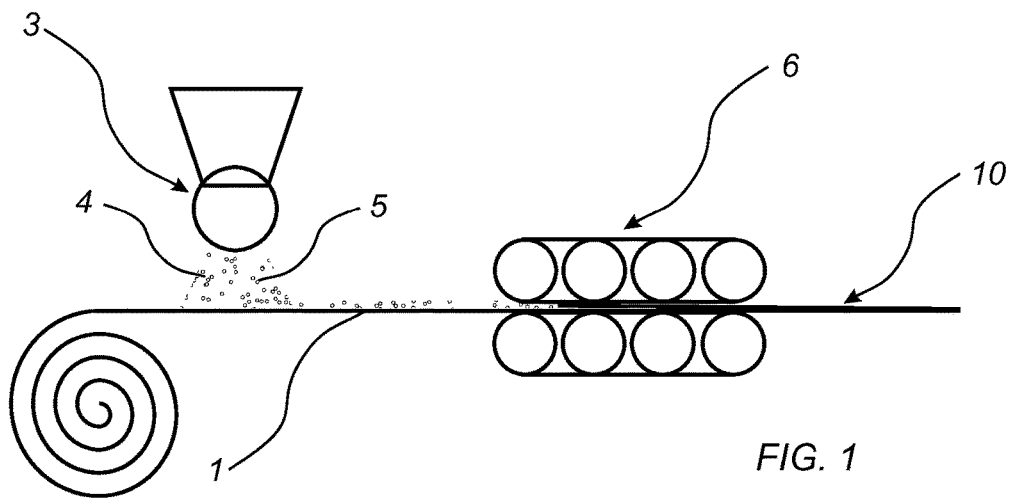
FIG. 1 shows a method to produce a wear resistant foil according a first embodiment.

A method to produce a wear resistant foil 10 according to an embodiment will now be described with reference to FIG. 1. FIG. 1 shows a production line for producing a wear resistant foil 10.

The first foil 1 comprises a first thermoplastic material. The first thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In FIG. 1, the first foil 1 is provided as a continuous web. In other embodiments, the first foil 1 may also be cut into sheets. The first foil 1 may also be formed by an extrusion process. The first foil 1 may also be formed of a powder layer comprising the first thermoplastic material in powder form.

Preferably, the first foil 1 is formed of the thermoplastic material. The first foil 1 may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil.

The first foil 1 may have a thickness of 0.1-1 mm.

In one embodiment, the first foil 1 is a decorative foil. The first foil 1 may be printed, for example by digital printing, direct printing, rotogravure, etc.

As shown in FIG. 1, an applying device 3 applies, preferably scatters, a second thermoplastic material 5 in powder form and wear resistant particles 4 on the first foil 1. In FIG. 1, the thermoplastic material 5 and the wear resistant particles 4 are applied as a mix. The thermoplastic material 5 and the wear resistant particles 4 may also be applied separately. Preferably, if applied separately, the wear resistant particles 4 are applied first, and the second thermoplastic material 5 is applied on the wear resistant particles 4.

The second thermoplastic material 5 may be the same as in the first foil 1, or being different from the thermoplastic material of the first foil 1. The second thermoplastic material 5 may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In the embodiment shown in FIG. 1, the second thermoplastic material 5 is applied as a powder. By powder is also meant powder that has formed granules of the thermoplastic material, dry blends of the thermoplastic material, or agglomerates of the thermoplastic material. The granules may comprise both the thermoplastic material 5 and the wear resistant particles 4. The agglomerates may comprise both the thermoplastic material 5 and the wear resistant particles 4.

The average particle size of the thermoplastic material 5 may be less than 500 µm, preferably 50-250 µm. The thermoplastic material 5 in a dry blend may have size of less than 500 µm. Granules of the thermoplastic material 5 may have an average particle size of 200-4000 µm, preferably less than 1000 µm.

In the embodiment shown in FIG. 1, the wear resistant particles 4 and the second thermoplastic material 5 is applied as a mix.

In embodiments, the second thermoplastic material 5 may be applied in molten form, which is described in more detail with reference to FIG. 6A. The wear resistant particles 4 may be mixed with the second thermoplastic material 5 in molten form or applied separately. The second thermoplastic 5 in molten form may be applied in an extrusion process such as extrusion lamination and extrusion coating on the first foil 1.

The wear resistant particles 4 may be aluminium oxide particles such as corundum. Alternatively, or as a complement, the wear resistant particles 4 may be carborundum, quartz, silica, glass, glass beads, glass spheres, silicon carbide, diamond particles, hard plastics, reinforced polymers and organics.

The wear resistant particles 4 preferably have an average particle size within the range of 10-200 µm, preferably within the range of 50-120 µm such as 50-100 µm. The wear resistant particles 4 may have an average particle size of less than 50 µm, preferably less than 45 µm. The wear resistant particles 4 may have a spherical shape or an irregular shape. The wear resistant particles 4 may be surface treated. The wear resistant particles 4 may be silane-treated particles.

The wear resistant particles 4 may have a refractive index similar to the refractive index of the second thermoplastic material 5. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

The wear resistant particles may be applied in an amount of 20-100 g/m2, preferably in an amount of 40-60 g/m2.

The wear resistant particles may have an average particle size being less than the thickness of the layer formed by the wear resistant particles and the second thermoplastic material after pressing. However, the wear resistant particles may have an average particle size being larger than the thickness of the layer formed by the wear resistant particles and the second thermoplastic material 5 after pressing. During pressing, the wear resistant particles are pressed into the first foil such that the wear resistant particles do not protrude beyond an upper surface of the layer formed by the second thermoplastic material 5, although the wear resistant particles having an average particle size exceeding the thickness of the layer formed by the wear resistant particles and the second thermoplastic material after pressing.

The ratio between the size of the wear resistant particles and the thickness of the layer formed by the wear resistant particles and the second thermoplastic material after pressing may be less than 1.5:1.

Scratch resistant particles (not shown) may also be applied on the first foil 1, as a mix together with the thermoplastic material 5 and the wear resistant particles 4 or separately. By scratch resistant particles are meant particles improving the scratch or scratch resistant properties of the foil. The scratch resistant particles may be applied together with the wear resistant particles 4, for example as a mix, or may be applied separately. Preferably, the scratch particles are arranged on an upper part of the layer formed by the thermoplastic material 5 and the wear resistant particles 4. The scratch resistant particles may be may be or comprise nano-sized silica particles, preferably fused silica particles. The scratch resistant particles may be or comprise aluminium oxide.

The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-50 µm, preferably 10-20 µm.

Additives may also be applied on the first foil 1, or together with the second thermoplastic material. Additives may be plasticizers, stabilizers, lubricants, degassing agents, coupling agents, compatibilizers, crosslinking agents, etc.

In one embodiment, the first foil 1 is a PVC foil and the second thermoplastic material 5 is polyurethane (PU) in powder form. In one embodiment, the first foil 1 is a PVC foil and the second thermoplastic material 5 is PVC in powder form.

The first foil 1 and the second thermoplastic material 5 in powder form are thereafter adhered to each other, for example, being pressed together, to form a wear resistant foil 10 comprising the first foil 1, the second thermoplastic material 5 and the wear resistant particles 4.

The first foil 1 and the second thermoplastic material 5 in powder form may be pressed together in a calendering process. As shown in FIG. 1, the first foil 1 and the second thermoplastic material 5 in powder form are pressed together in continuous press 6. The first and second thermoplastic material may be adhered together by pressure alone, by heat and pressure, by pressure and adhesive, or by heat, pressure, and adhesive. Preferably, both pressure and heat is applied in order to adhere the first foil and the second thermoplastic material together. As alternative or complements to a calendering process, a continuous or static press may also be used. The pressing operation may for example be made as a hot-hot process, a hot-cold process, etc. The pressing may be made with an embossed press matrix or press roller, such that an embossed structure is formed in the wear resistant foil.

Depending on the thermoplastic materials and process used, the pressure applied may be 5-100 bar, applied for example during 5-500 seconds. The temperature may be 80-300° C., such as 100-250° C., such as 150-200° C.

By the process described above with reference to FIG. 1, a wear resistant foil 10 is formed. The wear resistant foil 10 may be formed as a continuous foil, or be cut into sheets. The second thermoplastic material 5 and the wear resistant particles 4 form an upper part of the wear resistant foil 10. Preferably, the wear resistant particles 4 may be substantially homogenous distributed in the upper part of the wear resistant foil 10. The first foil 1 forms a lower part of the wear resistant foil 10. As seen in a cross-section of the wear resistant foil, the wear resistant particles 4 are heterogeneously distributed through the wear resistant foil 10. There is a higher concentration of the wear resistant particles 4 in the upper parts of the wear resistant foil 10 than in the lower parts of the wear resistant foil 10.

After adhering the layers, the wear resistant particles are enclosed by the first foil and the second thermoplastic material. Although the wear resistant particles and the second thermoplastic material may be applied as mix, during the pressing, the second thermoplastic material fuses and encloses the wear resistant particles. Preferably, the wear resistant particles do not protrude beyond the surface of the layer formed the second thermoplastic material facing away from the first foil. Thereby, a wear resistant foil having a smooth surface can be formed.

The wear resistant foil 10 is preferably transparent, or substantially transparent.

The second thermoplastic material 5 and the wear resistant particles 4 may be formed into a layer, which may have a thickness of 0.01-1 mm, preferably as measured in the final product, for example, after pressing or extruding. Preferably, the layer formed by the second thermoplastic material 5 and the wear resistant particles 4 has a thickness less than 0.5 mm, more preferably less than 75 µm such as about 50 µm, preferably as measured in the final product, for example, after pressing or extruding.

Different additives may be included to the first foil 1 compared to the second thermoplastic material 5 in powder form in order to obtain different properties in different layers of the wear resistant foil 10.

A wear resistant foil 10' may also be produced in accordance with the embodiment described with reference to FIG. 2. In the embodiment shown in FIG. 2, a second thermoplastic material 5 in powder form and wear resistant particles 4 are applied, preferably scattered, by an applying device 3 on a carrier 7. The carrier 7 may be a substrate. The carrier 7 may for example be a release foil or Teflon® treated press plate. It is also contemplated that the carrier 7 may be a core 21, for example, provided with a print. The core 21 may a thermoplastic core, a WPC (Wood Plastic Composite), a wood-based board such as HDF or MDF, a mineral board, etc. It is also contemplated that a first thermoplastic material in powder form may be applied on the carrier.

The second thermoplastic material 5 may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

By powder is also meant powder that has formed granules of the thermoplastic material 5, dry blends of the thermoplastic material 5, or agglomerates of the thermoplastic material 5. The granules may comprise both the thermoplastic material 5 and the wear resistant particles 4. The agglomerates may comprise both the thermoplastic material 5 and the wear resistant particles 4.

The average particle size of the thermoplastic material 5 may be less than 500 µm, preferably 50-250 µm. The thermoplastic material 5 in a dry blend may have size of less than 500 µm. Granules of the thermoplastic material 5 may have an average particle size of 200-4000 µm, preferably less than 1000 µm.

A layer of the second thermoplastic material 5 is applied on the carrier 7. Preferably, the second thermoplastic material 5 and the wear resistant particles 4 are applied as a mix. The second thermoplastic material 5 and the wear resistant particles 4 may also be applied separately. Preferably, if applied separately, the wear resistant particles 4 are applied first, and the second thermoplastic material 5 is applied on the wear resistant particles 4.

Figure 2:
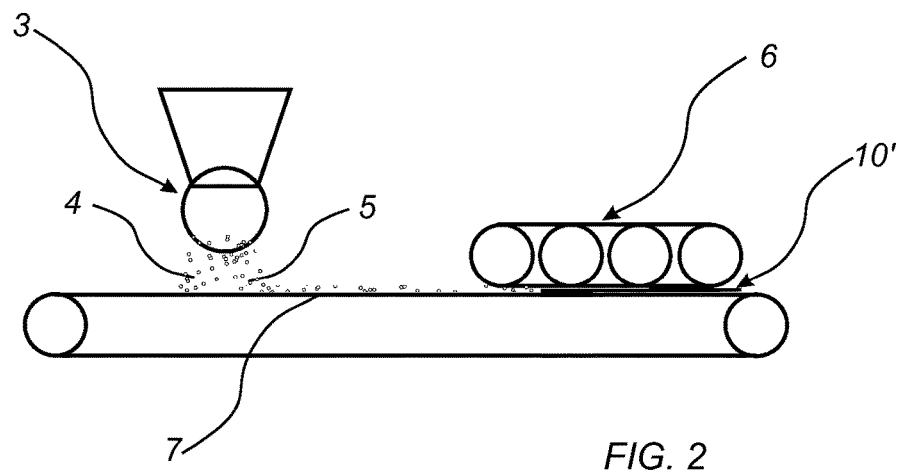
FIG. 2 shows a method to produce a wear resistant foil according to a second embodiment.

In the embodiment shown in FIG. 2, the second thermoplastic material 5 is applied in powder form. In embodiments, the second thermoplastic material 5 may be applied in molten form, which is described in more detail with reference to FIG. 6A. The wear resistant particles 4 may be mixed with the second thermoplastic material 5 in molten form or applied separately. The second thermoplastic 5 in molten form may be applied in an extrusion process such as extrusion lamination and extrusion coating on the carrier 7.

More than one type of thermoplastic material 5 may be applied on the carrier 7. Thermoplastic materials having different properties may be applied. As an example, a PVC powder may be applied, and a PU powder may be applied on the PVC powder for forming a wear resistant foil 10' having different properties. The wear resistant particles 4 may be applied in between the PVC powder and the PU powder. Different types of additives may also be added to the different thermoplastic materials in order to form a wear resistant foil 10' having different properties in different layers.

The wear resistant particles 4 may be aluminium oxide particles such as corundum. Alternatively, or as a complement, the wear resistant particles 4 may be carborundum, quartz, silica, glass, glass beads, glass spheres, silicon carbide, diamond particles, hard plastics, reinforced polymers and organics, or a combination thereof.

The wear resistant particles 4 preferably have an average particle size within the range of 10-200 µm, preferably within the range of 50-120 µm, such as 50-100 µm. The wear resistant particles 4 preferably have an average particle size of less than 50 µm, preferably less than 45 µm. The wear resistant particles 4 may have a spherical shape or an irregular shape. The wear resistant particles 4 may be surface treated. The wear resistant particles 4 may be silane-treated particles.

The wear resistant particles 4 may have a refractive index similar to the refractive index of the second thermoplastic material 5. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

The wear resistant particles may be applied in an amount of 20-100 g/m2, preferably in an amount of 40-60 g/m2.

The wear resistant particles may have an average particle size being less than the thickness of the layer formed by the wear resistant particles and the second thermoplastic material after pressing. However, the wear resistant particles may have an average particle size being larger than the thickness of the layer formed by the wear resistant particles and the second thermoplastic material after pressing. During pressing, the wear resistant particles are pressed into the carrier such that the wear resistant particles do not protrude beyond an upper surface of the layer, although the wear resistant particles have an average particle size exceeding the thickness of the layer formed by the wear resistant particles and the second thermoplastic material after pressing.

The ratio between the size of the wear resistant particles and the thickness of the layer formed by the wear resistant particles and the second thermoplastic material after pressing may be less than 1.5:1.

Scratch resistant particles (not shown) may also be applied on the carrier 7, or as a mix together with the thermoplastic material 5 and the wear resistant particles 4 or separately. By scratch resistant particles are meant particles improving the scratch or scratch resistant properties of the foil. The scratch resistant particles may be applied together with the wear resistant particles 4, for example as a mix, or may be applied separately. Preferably, the scratch particles are arranged on an upper part of the layer formed by the thermoplastic material 5 and the wear resistant particles 4. The scratch resistant particles may be may be or comprise nano-sized silica particles, preferably fused silica particles. The scratch resistant particles may be or comprise aluminium oxide.

The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-50 µm, preferably 10-20 µm.

Additives may also be applied on the carrier 7. Additives may be plasticizers, stabilizers, lubricants, degassing agents, coupling agents, compatibilizers, crosslinking agents, etc.

The additives may also be applied together with the second thermoplastic material 5.

The second thermoplastic material 5 in powder form and the wear resistant particles 4 are thereafter adhered to each other such as fused together, preferably pressed together to form a wear resistant foil 10'.

The second thermoplastic material 5 in powder form and the wear resistant particles 4 may be pressed together in a calendering process. As shown in FIG. 2, the second thermoplastic material 5 and the wear resistant particles 4 are pressed together in a continuous press 6. Preferably, both pressure and heat is applied in order to form a wear resistant foil 10' of the second thermoplastic material 5 and the wear resistant particles 4. As alternative or complements to a calendaring process, a continuous or static press may also be used. The pressing may for example be made as a hot-hot process, a hot-cold process, etc. The pressing may be made with an embossed press matrix or press roller, such that an embossed structure is formed in the wear resistant foil 10'. As described above, the second thermoplastic material 5 may also be extruded on the carrier 7, such as extrusion coated or extrusion laminated to the carrier.

Depending on the thermoplastic materials and process used, the pressure applied may be 5-100 bar, applied for example during 5-500 seconds. The temperature may be 80-300° C., such as 100-250° C., such as 150-200° C.

By the process described above with reference to FIG. 2, a wear resistant foil 10' is formed, comprising the second thermoplastic material and the wear resistant particles. The wear resistant foil 10' is preferably transparent, or substantially transparent.

The wear resistant foil may have a thickness of 0.01-1 mm, preferably as measured in the final product, for example, after pressing or extruding. Preferably, the wear resistant foil has a thickness less than 0.5 mm, more preferably less than 0.1 mm, preferably as measured in the final product, for example, after pressing or extruding.

After adhering the layers, the wear resistant particles are enclosed by the first foil and the second thermoplastic material. Although the wear resistant particles and the second thermoplastic material may be applied as mix, during the pressing, the second thermoplastic material fuses and encloses the wear resistant particles. Preferably, the wear resistant particles do not protrude beyond the surface of the layer formed the second thermoplastic material facing away from the first foil. Thereby, a wear resistant foil having a smooth surface can be formed.

Figure 3:
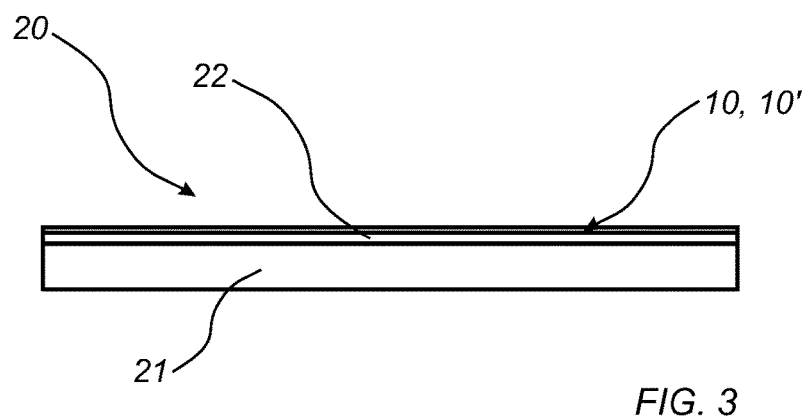
FIG. 3 shows a building panel.

The wear resistant foil 10, 10' produced accordance with the embodiments described when referring to FIG. 1 and FIG. 2, may in a subsequent step be adhered to a core 21 to form a building panel 20, as shown in FIG. 3. The building panel 20 may be a floor panel, a wall panel, a ceiling panel, a furniture component, etc.

The core 21 may comprise a third thermoplastic material. The third thermoplastic material may be the same as the first and/or second material, or be different from the first and/or the second material.

The third thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers. The core may be foamed.

In one embodiment, the core 21 comprises the third thermoplastic material and fillers. The fillers may comprise calcium carbonate, such as chalk and/or limestone, or sand.

In one embodiment, the core 21 is a Wood Plastic Composite (WPC), comprising the third thermoplastic material and wood particles as fillers.

The core 21 may be provided with a decorative layer 22 arranged on a top surface of the core 21, as shown in FIG. 3. The wear resistant foil 10, 10' is then arranged on the decorative layer 22. The decorative layer 22 may be a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative layer 22 is preferably printed, for example by direct printing, rotogravure, or digital printing.

The core 21 may also be provided with a balancing layer (not shown) arranged on a lower surface of the core 21, opposite the decorative layer 22. Any intermediate layer may also be arranged between the core 21 and the decorative layer 22.

The wear resistant foil 10, 10' produced according to the method described above with reference to FIG. 1 or FIG. 2, is arranged on the decorative layer. The core 21, the decorative layer 22, and the wear resistant foil 10, 10' are pressed together to form a building panel 20. Heat may also be applied when applying pressure. The core, the decorative layer and the wear resistant foil may be pressed together in a continuous or static press, or in a calendering operation. As alternatively, the wear resistant foil 10, 10', optionally comprising the decorative layer 22, may be adhered to the core 21 by an adhesive, such as hot melt.

The wear resistant foil 10, 10' is preferably transparent, or substantially transparent, for example, having a light transmittance index exceeding 80%, preferably exceeding 90%.

A coating (not shown) may be applied on the wear resistant foil 10, 10'. The coating may comprise acrylate or methacrylate monomer or acrylate or methacrylate oligomer. The coating may be radiation curing, such as UV curing or electron beam curing.

As an alternative to a separate decorative layer 22, a print may be printed directly on the top surface of core 21. The wear resistant foil 10, 10' is thereby arranged directly on the core 21.

In one embodiment, when the wear resistant foil 10 is produced according to the embodiment described with reference to FIG. 1, the first foil 1 forms a decorative layer. A separate decorative layer 22 may then be excluded. The first foil 1 may be printed, for example by digital printing, direct printing, rotogravure, etc. Preferably, the print is provided on side of the first foil 1 adapted to face the core 21. The wear resistant foil 10 is in this embodiment arranged directly on the core 21 of the above described type.

An embodiment of the building panel 20 comprises a core 21 comprising PVC, a decorative foil 22 comprising PVC, a wear resistant foil 10 comprising PVC in the first foil 1 and PU applied as the second thermoplastic material 5.

In other embodiments, the core 21 may be a wood-based board or a mineral board. The core may, for example, be a HDF, MDF, particleboard, plywood, OSB, etc.

As an alternative to the decorative foil, the decorative layer 22 may be formed of a thermoplastic material applied as a powder on the core. A print may be printed in the powder thermoplastic material. The thermoplastic material in powder form may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The wear resistant foil 10, 10' is arranged on the powder layer and pressed together. The core 21 may be of the above described type.

Another alternative to the decorative foil is to apply a thermosetting binder, preferably an amino resin and in powder form, and lignocellulosic or cellulosic particles for forming the decorative layer 22 on the core 21. A print is may be printed in the powder layer, or pigments may be included. The core may be of the above described type. The wear resistant foil 10, 10' is arranged on the powder layer and pressed together under heat, such that the thermosetting binder of the decorative layer is cured.

Another alternatives for forming the decorative layer 22 are providing a veneer layer, such as a wood veneer layer or a cork veneer layer or a paper layer for forming the decorative layer.

The different layers, i.e., the core 21, the decorative layer 22, the wear resistant foil 10, 10', may be provided as continuous layers or being cut into sheets for the embodiment described with reference to FIG. 3.

Figure 4:
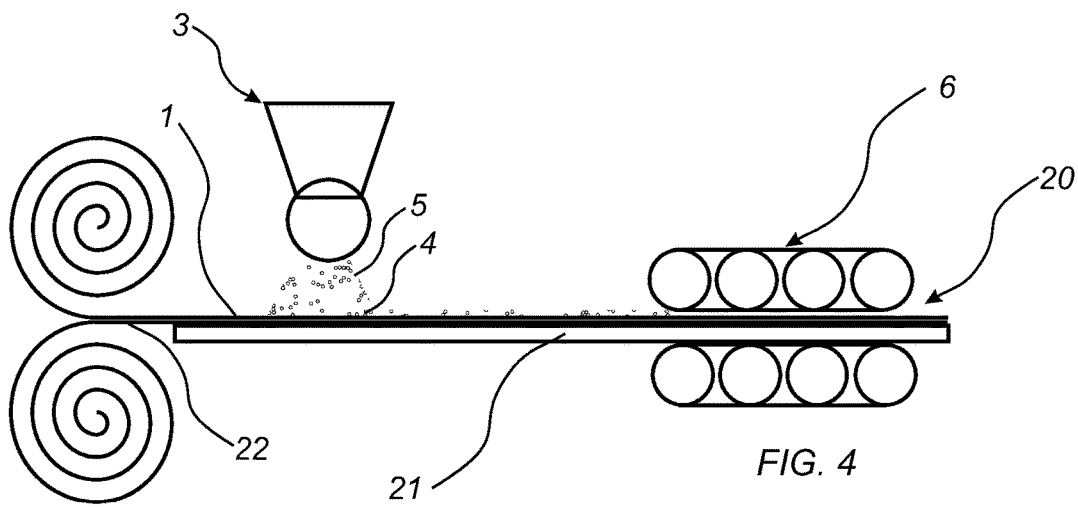
FIG. 4 shows a method to produce a building panel.

FIG. 4 shows a method to produce a building panel 20 including forming a wear resistant foil 10 integrated into the production of the building panel 20. The building panel 20 may be a floor panel, a wall panel, a ceiling panel, a furniture component, etc.

A core 21 is provided. The core 21 may comprise a third thermoplastic material. The third thermoplastic material may be the same as the first and/or second material, or be different from the first and/or the second material.

The third thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core 21 may be formed of several layers. The core may be foamed.

In one embodiment, the core 21 comprises the third thermoplastic material and fillers. The fillers may comprise calcium carbonate, such as chalk and/or limestone, or sand.

In one embodiment, the core 21 is a Wood Plastic Composite (WPC), comprising the third thermoplastic material and wood particles as fillers.

The core 21 may be provided with a decorative layer 22 arranged on a top surface of the core 21. The wear resistant foil 10 is then arranged on the decorative surface 22. The decorative layer 22 may be a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative layer 22 is preferably printed, for example by direct printing, rotogravure, or digital printing.

The core 21 may also be provided with a balancing layer (not shown) arranged on a lower surface of the core 21, opposite the decorative layer 22. Any intermediate layer or layers may be arranged between the core 21 and the decorative layer 22.

A first foil 1 is arranged on the core 12. The first foil 1 comprises a first thermoplastic material. The first thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

A first foil 1 is provided, preferably as a continuous web. The first foil 1 may also be cut into sheets. The first foil 1 may also be formed by an extrusion process in connection with producing the building panel. The first foil 1 may also be formed of a powder layer comprising the first thermoplastic material in powder form.

Preferably, the first foil 1 is formed of the thermoplastic material. The first foil may substantially consist of the thermoplastic material, and optionally additives. Additives may be plasticizers, stabilizers, lubricants, degassing agents, coupling agents, compatibilizers, crosslinking agents, etc.

In one embodiment, the first foil 1 is a PVC foil.

The first foil 1 may have a thickness of 0.1-1 mm.

As shown in FIG. 4, an applying device 3 applies, preferably scatters, a second thermoplastic material 5 in powder form and wear resistant particles 4 on the first foil 1. In FIG. 1, the second thermoplastic material 5 and the wear resistant particles 4 are applied as a mix. The thermoplastic material 5 and the wear resistant particles 4 may also be applied separately. Preferably, if applied separately, the wear resistant particles 4 are applied first and the second thermoplastic material 5 is applied on the wear resistant particles 4.

The second thermoplastic material 5 may be the same as in the first foil 1, or being different from the thermoplastic material of the first foil 1. The second thermoplastic may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

In the embodiment shown in FIG. 4, the second material 5 is applied as a powder. By powder is also meant powder that has formed granules of the thermoplastic material 5, dry blends of the thermoplastic material 5, or agglomerates of the thermoplastic material 5. The granules may comprise both the thermoplastic material 5 and the wear resistant particles 4. The agglomerates may comprise both the thermoplastic material 5 and the wear resistant particles 4.

The average particle size of the thermoplastic material 5 may be less than 500 μm, preferably 50-250 μm. The thermoplastic material 5 in a dry blend may have size of less than 500 μm. Granules of the thermoplastic material 5 may have an average particle size of 200-4000 μm, preferably less than 1000 μm.

In the embodiment shown in FIG. 4, the wear resistant particles 4 and the second thermoplastic material is applied as a mix.

In the embodiment shown in FIG. 4, the second thermoplastic material 5 is applied in powder form. In embodiments, the second thermoplastic material 5 may be applied in molten form, which is described in more detail with reference to FIG. 6B. The wear resistant particles 4 may be mixed with the second thermoplastic material 5 in molten form or applied separately. The second thermoplastic 5 in molten form may be applied in an extrusion process such as extrusion lamination and extrusion coating on the first foil 1.

The wear resistant particles 4 may be aluminium oxide particles such as corundum. Alternatively, or as a complement, the wear resistant particles 4 may be carborundum, quartz, silica, glass, glass beads, glass spheres, silicon carbide, diamond particles, hard plastics, reinforced polymers and organics, or a combination thereof.

The wear resistant particles 4 preferably have an average particle size within the range of 10-200 μm, preferably within the range of 50-120 μm, such as 50-100 μm. The wear resistant particles 4 may have an average particle size of less than 50 μm, preferably less than 45 μm. The wear resistant particles 4 may have a spherical shape or an irregular shape. The wear resistant particles 4 may be surface treated. The wear resistant particles 4 may be silane-treated particles.

The wear resistant particles 4 may have a refractive index similar to the refractive index of the second thermoplastic material 5. The wear resistant particles may have a refractive index of 1.4-1.7. In one embodiment, the wear resistant particle may have a refractive index of 1.4-1.9, preferably 1.5-1.8, for example, 1.7-1.8. The refractive index of the wear resistant particles may not differ from the refractive index of the second thermoplastic material more than ±20%.

The wear resistant particles may be applied in an amount of 20-100 g/m2, preferably in an amount of 40-60 g/m2.

The wear resistant particles may have an average particle size being less than the thickness of the layer formed by the wear resistant particles and the second thermoplastic material after pressing. However, the wear resistant particles may have an average particle size being larger than the thickness of the layer formed by the wear resistant particles and the second thermoplastic material after pressing. During pressing, the wear resistant particles are pressed into the first foil such that the wear resistant particles do not protrude beyond an upper surface of the layer, although the wear resistant particles having an average particle size exceeding the thickness of the layer formed by the wear resistant particles and the second thermoplastic material after pressing.

The ratio between the size of the wear resistant particles and the thickness of the layer formed by the wear resistant particles and the second thermoplastic material after pressing may be less than 1.5:1.

Scratch resistant particles (not shown) may also be applied on the first foil 1. By scratch resistant particles are meant particles improving the scratch or scratch resistant properties of the first foil 1. The scratch resistant particles may be applied together with the wear resistant particles, for example as a mix, or may be applied separately. Preferably, the scratch particles are arranged on an upper part of the layer formed by the thermoplastic material 5 and the wear resistant particles 4. The scratch resistant particles may be may be or comprise nano-sized silica particles, preferably fused silica particles. The scratch resistant particles may be or comprise aluminium oxide.

The scratch resistant particles may be disc shaped particles, preferably having a width/thickness ratio being equal or exceeding 3:1, more preferably being equal or exceeding 5:1. Such disc-shaped particles orientate along the surface of the foil, thereby improving the scratch resistance of the foil. The scratch resistant particles may have an average particle size of 1-50 µm, preferably 10-20 µm.

Additives may also be applied on the first foil 1, preferably together with the second thermoplastic material 5. Additives may be plasticizers, stabilizers, lubricants, degassing agents, coupling agents, compatibilizers, crosslinking agents, etc.

In one embodiment, the first foil 1 is a PVC foil and the second thermoplastic material 5 is PU. In one embodiment, the first foil 1 is a PVC foil and the second thermoplastic material 5 is PVC.

The different layers, i.e., the core 21, the decorative layer 22, the first foil 1, may be provided as continuous layers or being cut into sheets.

The core 21, the first foil 1 and the second thermoplastic material 5 in powder form with the wear resistant particles 4 are thereafter adhered to each other, for example, pressed together, to form a building panel 20. The first foil 1 and the second thermoplastic material 5 with the wear resistant particles 4 form a wear resistant foil 10 of the building panel 20.

The wear resistant foil 10 is preferably transparent, or substantially transparent, for example, having a light transmittance index exceeding 80%, preferably exceeding 90%.

The core 21, the first foil 1 and the second thermoplastic material 5 are preferably pressed together in a pressing station 6. The press may be a continuous or static press. The first and second foil may be adhered together by pressure alone, by heat and pressure, by pressure and adhesive, or by heat, pressure, and adhesive. Preferably, both pressure and heat is applied in order to adhere the first and the second foil to each other. The pressing operation may for example be made as a hot-hot process, a hot-cold process, etc. Depending on the thermoplastic materials and process used, the pressure applied may be 5-100 bar, applied for example during 5-500 seconds. The temperature may be 80-300° C., such as 100-250° C., such as 150-200° C. The pressing may be made with an embossed press matrix or press roller, such that an embossed structure is formed in the wear resistant foil. As an alternative, the layers may be adhered to each other by an adhesive such as glue, for example, hot melt.

The second thermoplastic material 5 and the wear resistant particles 4 form a layer, which may have a thickness of 0.01-1 mm, preferably as measured in the final product, for example, after pressing or extruding. Preferably, the layer formed by the second thermoplastic material 5 and the wear resistant particles 4 has a thickness less than 0.5 mm, more preferably less than 75 µm such as about 50 µm, preferably as measured in the final product, for example, after pressing or extruding.

After adhering, the wear resistant particles are enclosed by the first foil and the second thermoplastic material. Although the wear resistant particles and the second thermoplastic material may be applied as mix, during the pressing, the second thermoplastic material fuses and encloses the wear resistant particles. Preferably, the wear resistant particles do not protrude beyond the surface of the layer formed the second thermoplastic material facing away from the first foil. Thereby, a wear resistant foil having a smooth surface can be formed.

A coating (not shown) may be applied on the wear resistant foil 10. The coating may comprise acrylate or methacrylate monomer or acrylate or methacrylate oligomer. The coating may be radiation curing, such as UV curing or electron beam curing.

As an alternative to a separate decorative layer 22, a print may be printed directly on the top surface of core 21. The first foil 1 is thereby arranged directly on the core 21.

As an alternative to a separate decorative layer 22, the first foil 1 may be a decorative foil. The first foil 1 may be printed, for example by digital printing, direct printing, rotogravure, etc. Preferably, the print is provided on a side of the first foil 1 adapted to face the core 21. The first foil 1 is thereby arranged directly on the core 21.

As an alternative to the decorative foil described above, the decorative layer 22 may be formed of a thermoplastic material applied as a powder on the core. A print may be printed in the powder thermoplastic material. The thermoplastic material in powder form may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The first foil 1 is arranged on the powder layer and pressed together, as described above. The core 21 may be of the above described type.

Another alternative to the decorative foil described above is to apply a thermosetting binder, preferably an amino resin and in powder form, and lignocellulosic or cellulosic particles for forming the decorative layer 22 on the core 21. A print is may be printed in the powder layer, or pigments may be included. The core may be of the above described type. The first foil 1 is arranged on the powder layer are pressed together under heat as described above, such that the thermosetting binder of the decorative layer is cured.

Another alternatives for forming the decorative layer 22 are providing a wood veneer layer, a cork layer, or a paper layer for forming the decorative layer.

In one embodiment, the first foil 1 may be a decorative foil. The first foil 1 may be provided with a print, for example by digital printing, direct printing or rotogravure.

In one embodiment, both the decorative layer 22 and the first foil 1 are excluded. The second thermoplastic material 5 in powder form and the wear resistant particles 4 are applied directly on the core. The second thermoplastic material 5 is of the above described type. The core 21 is of the above described type. An upper surface of the core 21 may be provided with a print, preferably a digital print. The wear resistant particles 4 of the above described type may be applied together with the second thermoplastic material 5 as a mix or separately. Scratch resistant particles of the above described type may also be applied.

The second thermoplastic material 5 is fused, preferably by applying heat and pressure, into a wear resistant foil 10' comprising the wear resistant particles 4 arranged on the core 12 in a pressing operation as described above.

It is contemplated that the core 21 may be excluded in the embodiments described with reference to FIG. 4. By adhering, for example, pressing, the decorative layer 22 and the second thermoplastic material 5 of the above described type with the wear resistant particles 4, a decorative substrate having wear resistant properties is provided.

In addition to the building panel 20 described above with reference to FIG. 3, building panels 20 having another structure may also be provided by the methods described above.

Figure 5A:
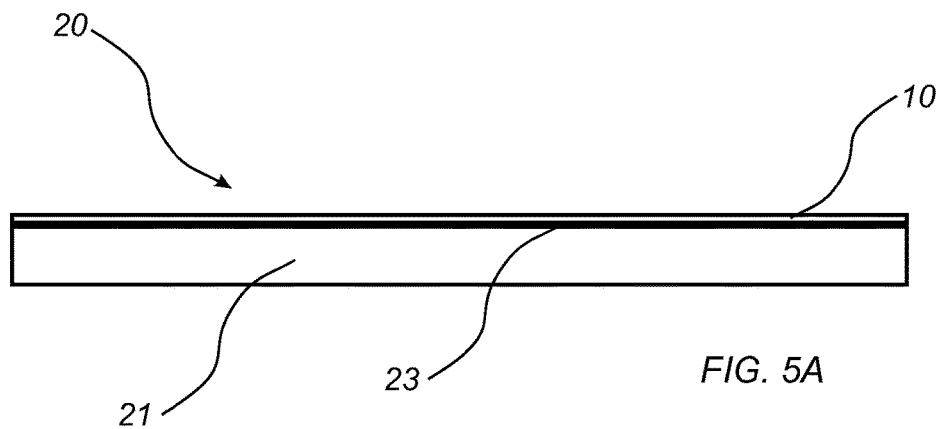
FIGS. 5A-B show embodiments of a building panel.

According to one embodiment, which is shown in FIG. 5A, a building panel 20 comprising a core 21 of the above described type and a wear resistant foil 10' manufactured according to the embodiment described with reference to FIG. 2. An upper surface of the core 21 may be provided with a print 23, for example printed by for example by digital printing, direct printing or rotogravure. The wear resistant foil 10' is arranged directly on the core 21. The wear resistant foil 10' is formed of the second thermoplastic material 5 of the above described type applied in powder form and the wear resistant particles 4 of the above described type. The wear resistant particles 4 are preferably substantially homogenously distributed in the wear resistant foil 10'.

Figure 5B:
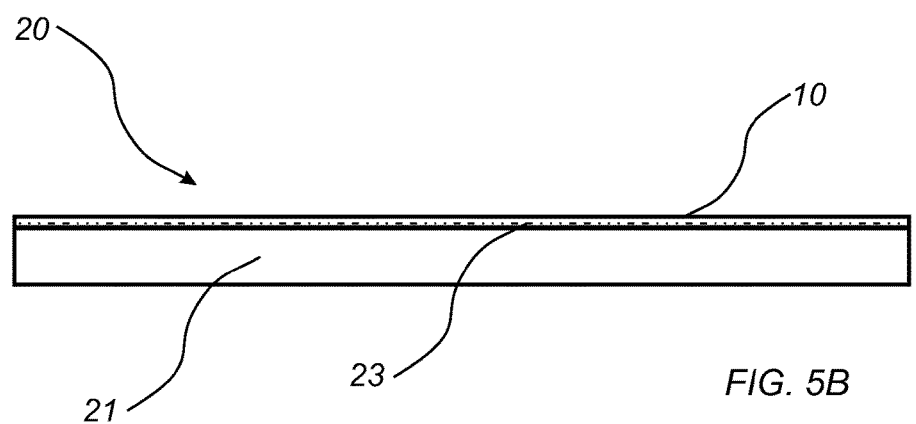

According to one embodiment, which is shown in FIG. 5B, a building panel 20 comprising a core 21 of the above described type and a wear resistant foil 10 manufactured according to the embodiment described with reference to FIG. 1. Alternatively, the building panel 20 is manufactured according to the embodiment described with reference to FIG. 4 wherein the decorative layer 20 is excluded. The wear resistant foil 10 is arranged directly on the core 12. The wear resistant foil 10 comprises the first foil 1 of the above described type and the second thermoplastic material 5 of the above described type applied with the wear resistant particles 4 of the above described type. The first foil 1 may be a decorative foil. The first foil 1 may be provided with a print 23, for example printed by digital printing, direct printing or rotogravure. Alternatively, or as a complement, an upper surface of the core 21 is provided with a print 23. The wear resistant foil 10 is arranged directly on the core 21. The wear resistant foil 10 may be produced integrated with the method of producing the building panel, as described with reference to FIG. 4, or as a separate process as described with reference to FIG. 1.

According to one embodiment, the building panel 20 comprises a core 21 of the above described type and a wear resistant foil 10' formed of the second thermoplastic material 5 of the above described type and the wear resistant particles 4 the above described type applied directly on an upper surface of the core 21. The upper surface of the core 21 may be provided with a print 23, for example printed by for example by digital printing, direct printing or rotogravure.

Any of the above described building panels may be provided with a mechanical locking system. The mechanical locking system may be of the type described in WO 2007/015669, WO 2008/004960, WO 2009/116926, or WO 2010/087752, the entire contents of each is expressly incorporated by reference herein.

Figure 6A:
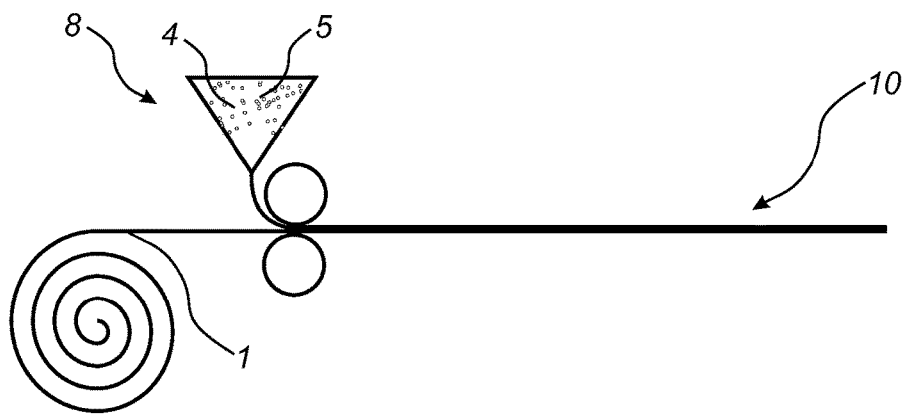
FIG. 6A shows a method to produce a wear resistant foil.
Figure 6B:
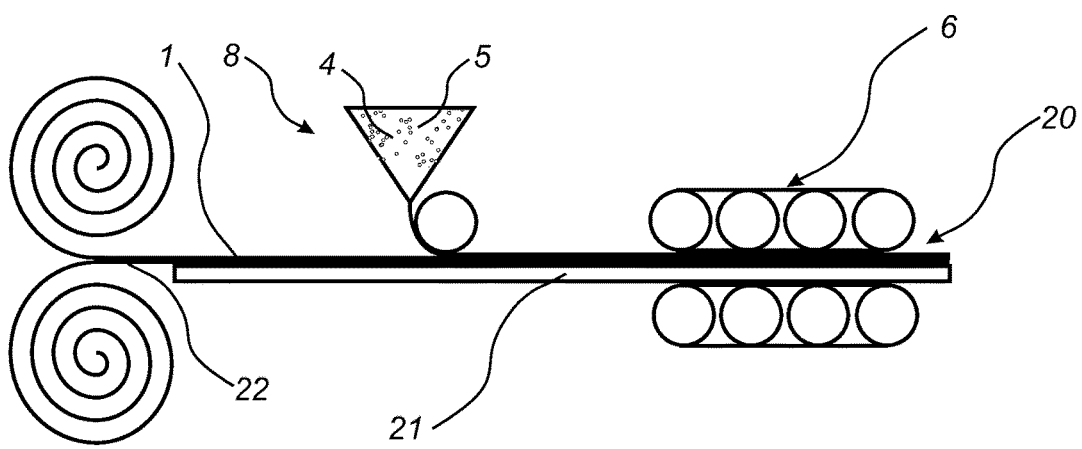
FIG. 6B shows a method to produce a building panel.

In all embodiments, the second thermoplastic material of the above type may be applied in an extrusion process, which is shown in FIGS. 6A-B. In FIG. 6A, a first foil 1 is provided. The first foil 1 is of the type described above with reference to FIGS. 1, 3, 5, 5A-B. In the embodiment shown FIG. 6A, the second thermoplastic material 5 of the above described type is mixed with the wear resistant particles 4 of the above described type. The second thermoplastic material 5 is preferably provided as granulates. The second thermoplastic material 5 in molten form is applied on the first foil 1 comprising the first thermoplastic material by an extruder 8. For example, the second thermoplastic material 5 is applied on the first foil 1 by an extrusion process such as extrusion lamination or extrusion coating.

As an alternative to mix the second thermoplastic material 5 with the wear resistant particles 4, the wear resistant particles 4 may be applied separately form the second thermoplastic material 5 (not shown). The wear resistant particles 4 may be applied on the first foil 1 prior to applying the second thermoplastic material 5 by the extrusion process such as extrusion lamination or extrusions coating on the first foil 1.

The method to produce a wear resistant foil 10 by using an extrusion technique as described above with reference to FIG. 6A is also applicable when forming a building panel corresponding to the embodiment shown in FIG. 4, which is shown in FIG. 6B.

In FIG. 6B, a first foil 1 and a core 21 are provided. The first foil 1 and the core 21 are of the type described above with reference to FIGS. 3, 4, and 5A-B. In the embodiment shown FIG. 6B, the second thermoplastic material 5 of the above described type is mixed with the wear resistant particles 4 of the above described type. The second thermoplastic material 5 is preferably provided as granulates. The second thermoplastic material 5 in molten form is applied on the first foil 1 comprising the first thermoplastic material by an extruder 8. For example, the second thermoplastic material 5 is applied on the first foil 1 by an extrusion process such as extrusion lamination or extrusion coating.

As an alternative to mix the second thermoplastic material 5 with the wear resistant particles 4, the wear resistant particles 4 may be applied separately form the second thermoplastic material 5 (not shown). The wear resistant particles 4 may be applied on the first foil 1 prior to applying the second thermoplastic material 5 by the extrusion process such as extrusion lamination or extrusions coating on the first foil 1.

The core 21, the first foil 1 provided with the wear resistant particles 4 and the second thermoplastic material 5 are adhered together for forming a building panel 20, for example, by pressing such as calendaring as shown in FIG. 6B. Alternatively, the layers may be adhered to each other by means of an adhesive, such as hot melt.

It is also contemplated that the co-extruding may be used to form the wear resistant foil. The first foil comprising the first thermoplastic material and a second foil comprising the second thermoplastic material may be formed by co-extruding the first and the second foil. The wear resistant particles may be mixed with the second thermoplastic material, or applied separately on the first and/or the second foil.

It is contemplated that there are numerous modifications of the embodiments described herein, which are still within the scope of the disclosure. For example, it is contemplated that more than one wear resistant foil may be arranged on a core for forming a building panel.

For example, it is contemplated that after pressing, the boundaries between the first foil 1 and the layer formed of the second thermoplastic material 5 in powder and the wear resistant particles 4 may be less distinct.

EXAMPLES

Example 1: Comparative Example

A PVC wear layer foil with a thickness of 0.3 mm was positioned on a decorative foil with a thickness of 0.1 mm. The two foils were laminated on to a PVC core material using a temperature of 160° C., a pressure of 20 bars and a pressing time of 40 seconds. The resulting product was a LVT product. The LVT product was found to have a wear resistance of 3200 revolutions as tested in a Taber abrader.

Example 2: PVC Powder Composition on Foil

A PVC wear layer foil with a thickness of 0.3 mm was positioned on a decorative foil with a thickness of 0.1 mm. 150 g/m2 of a powder composition comprising 90 wt-% PVC and 10 wt-% Al2O3 was scattered on the wear layer foil. The PVC powder composition and the two foils were laminated on to a PVC core material using a temperature of 160° C., a pressure of 20 bars and a pressing time of 40 seconds. The resulting product was a LVT product. The LVT product was found to have a wear resistance higher than 8000 revolutions as tested in a Taber abrader.

Example 3: PU Powder Composition on Foil

A PVC wear layer foil with a thickness of 0.3 mm was positioned on a decorative foil with a thickness of 0.1 mm. 150 g/m2 of a powder composition comprising 90 wt-% PU powder and 10 wt-% Al2O3 was scattered on the wear layer foil. The PU powder composition and the two foils were laminated on to a PVC core material using a temperature of 160° C., a pressure of 20 bars and a pressing time of 40 seconds. The resulting product was a LVT product. The LVT product was found to have a wear resistance higher than 8000 revolutions as tested in a Taber abrader.

Example 4: PU Foil on PVC Foil

A printed decorative PVC foil having a thickness of 0.08 mm was arranged on a core comprising three layers and having a thickness of 4 mm. A PVC wear layer having a thickness of 0.25 mm was arranged on the decorative PVC foil. Wear resistant particles in form of aluminium oxide were applied in an amount of 40 g/m2 on the PVC wear layer. A PU foil having a thickness of 0.05 mm was arranged on the wear resistant particles and the PVC wear layer. The different layers were pressed together in a cold-hot-cold process. The pressure applied was 10 bar. The temperatures applied in the cold-hot-cold process were 50° C., 140° C., and 50° C. The product was pressed at 140° C. during 4 minutes. The total pressing time was approximately 55 minutes. The resulting product was a LVT product. The LVT product was found to have a wear resistance higher than 8000 revolutions as tested in a Taber abrader.

The invention claimed is:

1. A method to produce a wear resistant foil, comprising:
   providing a first foil comprising a first thermoplastic material,
   applying wear resistant particles and a second thermoplastic material on the first foil, the second thermoplastic material being applied in powder form; and
   adhering the first foil to the second thermoplastic material and the wear resistant particles and adhering the wear resistant particles to the second thermoplastic material to form the wear resistant foil, wherein
   the adhering of first foil to the second thermoplastic material and the wear resistant particles and the adhering of the wear resistant particles to the second thermoplastic material are by pressing, and
   the wear resistant particles have an average particle size larger than a thickness of the second thermoplastic material after the pressing of the second thermoplastic material.

2. The method according to claim 1, wherein the wear resistant particles are enclosed by the first foil and the second thermoplastic material after the first foil is adhered to the second thermoplastic material and the wear resistant particles.

3. The method according to claim 1, wherein the wear resistant particles and the second thermoplastic material are applied as a mix.

4. The method according to claim 1, wherein the first thermoplastic material comprises polyvinyl chloride (PVC), polyester (PE), polypropylene (PP), polyethylene (PE), polystyrene (PS), polyurethane (PU), polyethylene terephthalate (PET), polyacrylate, methacrylates, polycarbonate, polyvinyl butyral, polybutylene terephthalate, or a combination thereof.

5. The method according to claim 1, wherein the second thermoplastic material comprises polyvinyl chloride (PVC), polyester (PE), polypropylene (PP), polyethylene (PE), polystyrene (PS), polyurethane (PU), polyethylene terephthalate (PET), polyacrylate, methacrylates, polycarbonate, polyvinyl butyral, polybutylene terephthalate, or a combination thereof.

6. The method according to claim 1, wherein the second thermoplastic material comprises polyvinyl chloride (PVC) or polyurethane (PU).

7. The method according to claim 1, wherein the wear resistant particles comprise aluminium oxide.

8. The method according to claim 1, wherein the wear resistant particles have an average particle size of less than 45 µm.

9. The method according to claim 8, wherein the wear resistant particles have an average particle size of less than 45 µm.

10. The method according to claim 1, wherein a thickness of a layer formed by the second thermoplastic material and the wear resistant particles is less than 75 µm after the second thermoplastic material is adhered to the wear resistant particles.

11. The method according to claim 1, wherein the wear resistant foil is substantially transparent.

12. The method according to claim 1, wherein the adhering of the first foil to the second thermoplastic material and the wear resistant particles and the adhering of the wear resistant particles to the second thermoplastic material is by pressing without an adhesive.

13. The method according to claim 1, wherein the second thermoplastic material possesses an upper surface after the pressing, the wear resistant particles being entirely below the upper surface of the second thermoplastic material after the pressing.

14. The method according to claim 1, wherein the first thermoplastic material is polyvinyl chloride and the second thermoplastic material is polyurethane.

15. A method to produce a building panel, comprising:
providing a core,
applying a first foil comprising a first thermoplastic material on the core,
applying wear resistant particles and a second thermoplastic material on the first foil, the second thermoplastic material being applied in powder form, and
adhering the core to the first foil and to the second thermoplastic material and the wear resistant particles collectively to one another to form a building panel by pressing the core, the first foil, the wear resistant particles, the second thermoplastic material together, wherein
the wear resistant particles protrude into the first foil of the formed building panel due to the pressing.

16. The method according to claim 15, wherein the wear resistant particles are enclosed by the first foil and the second thermoplastic material after the first foil is adhered to the second thermoplastic material and the wear resistant particles.

17. The method according to claim 15, wherein the wear resistant particles and the second thermoplastic material are applied as a mix.

18. The method according to claim 15, wherein the first thermoplastic material comprises polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

19. The method according to claim 15, wherein the second thermoplastic material comprises polyvinyl chloride (PVC), polyester (PE), polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

20. The method according to claim 15, wherein the second thermoplastic material comprises polyvinyl chloride (PVC) or polyurethane (PU).

21. The method according to claim 15, wherein the wear resistant particles comprise aluminium oxide.

22. The method according to claim 15, wherein a thickness of a layer formed by the second thermoplastic material and the wear resistant particles is less than 75 μm after the second thermoplastic material is adhered to the wear resistant particles.

23. The method according to claim 15, wherein the first foil, the wear resistant particles and the second thermoplastic material form a wear resistant foil.

24. The method according to claim 15, wherein the core comprising a third thermoplastic material.

25. The method according to claim 24, wherein the third thermoplastic material comprises polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

26. The method according to claim 15, further comprising arranging a decorative layer on the core.

27. The method according to claim 15, wherein the collective adhering of the first foil, the wear resistant particles, and the second thermoplastic material is by pressing without an adhesive.

28. A method to produce a wear resistant foil, comprising
providing a first foil comprising a first thermoplastic material,
applying wear resistant particles and a second thermoplastic material on the first foil, and
adhering the first foil to the second thermoplastic material and the wear resistant particles by pressing and adhering the wear resistant particles to the second thermoplastic material to form the wear resistant foil by the pressing which further comprises pressing the wear resistant particles into the first foil,
wherein the second thermoplastic material is applied in molten form, and
wherein the wear resistant particles of the wear resistant foil formed by the adhering and the pressing are present in a layer formed by the second thermoplastic material and also protrude into the first foil.

29. A method to produce a building panel, comprising:
providing a core,
applying a first foil comprising a first thermoplastic material on the core,
applying wear resistant particles and a second thermoplastic material on the first foil, and
adhering the core to the first foil and to the second thermoplastic material and the wear resistant particles and adhering the first foil, the wear resistant particles, the second thermoplastic material collectively to one another to form a building panel by pressing,
wherein the core is HDF, MDF, particleboard, OSB, Wood Plastic Composite (WPC), or a mineral board, and
wherein the wear resistant particles have an average particle size larger than a thickness of the second thermoplastic material after the pressing to form the building panel.

30. A method to produce a wear resistant foil, comprising
providing a carrier,
applying wear resistant particles and a second thermoplastic material on the carrier, the second thermoplastic material being applied in powder form,
adhering the wear resistant particles and the second thermoplastic material to each other to form the wear resistant foil by pressing, and
releasing the wear resistant foil from the carrier,
wherein the wear resistant particles have an average particle size larger than a thickness of the second thermoplastic material after the pressing of the second thermoplastic material.

31. The method according to claim 30, wherein the wear resistant particles are enclosed by the second thermoplastic material after the wear resistant particles and the second thermoplastic material are adhered to each other.

32. The method according to claim 30, wherein the wear resistant particles and the second thermoplastic material are applied as a mix.

33. The method according to claim 30, wherein the second thermoplastic material comprises polyvinyl chloride (PVC) or polyurethane (PU).

34. The method according to claim 30, wherein the wear resistant particles have an average particle size of less than 45 μm.

35. The method according to claim 30, wherein a thickness of a layer formed by the second thermoplastic material and the wear resistant particles is less than 75 μm after the second thermoplastic material is adhered to the wear resistant particles.

36. The method according to claim 30, wherein the carrier is a core, and the step of adhering comprises adhering the carrier to the second thermoplastic material and the wear resistant particles.

* * * * *